US010599929B2

(12) United States Patent
Cuban et al.

(10) Patent No.: US 10,599,929 B2
(45) Date of Patent: Mar. 24, 2020

(54) EVENT MONITORING WITH OBJECT DETECTION SYSTEMS

(71) Applicant: Motionloft, Inc., San Francisco, CA (US)

(72) Inventors: Mark Cuban, Dallas, TX (US); Joyce Reitman, San Francisco, CA (US); Paul McAlpine, Dublin, CA (US)

(73) Assignee: MOTIONLOFT, INC., San Francisco, CA (US)

( * ) Notice: Subject to any disclaimer, the term of this patent is extended or adjusted under 35 U.S.C. 154(b) by 235 days.

(21) Appl. No.: 15/862,037

(22) Filed: Jan. 4, 2018

(65) Prior Publication Data

US 2019/0205659 A1 Jul. 4, 2019

(51) Int. Cl.
*G06K 9/00* (2006.01)
*G06T 7/70* (2017.01)

(52) U.S. Cl.
CPC ..... *G06K 9/00778* (2013.01); *G06K 9/00718* (2013.01); *G06K 9/00785* (2013.01); *G06T 7/70* (2017.01); *G06K 2009/00738* (2013.01); *G06T 2207/10016* (2013.01)

(58) Field of Classification Search
CPC .............. B64C 39/024; B64C 2201/00; G05D 1/0033; G05D 1/0038; G05D 1/0044; G05D 1/0231; G05D 1/0214; G05D 1/0212; A61B 2034/2065; B60T 2210/00; B60T 2210/30; B60T 2210/32; G08B 13/19608; G08B 13/19606; G08B 13/196; G08G 1/0968; G01C 21/3626; G06K 2209/21; G06K 9/00771; G06K 9/6202; G06K 9/00221; G06K 9/00335; G06K 9/00369; G06K 9/627; G06K 9/00718; G06K 9/6256; G06K 9/62; G06F 3/011; G06F 3/0304; G06F 16/2264; G06F 16/9024; G06F 3/0346; A63F 13/213; A63F 13/24; A63F 13/426; A63F 13/428; A63F 13/655; A63F 13/00; G06T 7/73; G06N 3/04; G06N 3/08; G06N 3/02; H04N 7/181; H04N 5/2226; G08C 17/00; G08C 17/02
See application file for complete search history.

(56) References Cited

U.S. PATENT DOCUMENTS 8,855,900 B2    10/2014   Lection et al.
8,977,489 B2 *   3/2015   Szczerba .............. G01C 21/365
                                                                                                                            345/7
9,802,538 B2 *   10/2017   Augst ....................... B60R 1/00
(Continued)

OTHER PUBLICATIONS

International Search Report and Written Opinion issued in PCT Application No. PCT/US18/64311 dated Mar. 26, 2019.

*Primary Examiner* — Duy M Dang
(74) *Attorney, Agent, or Firm* — Hogan Lovells US LLP

(57) ABSTRACT

An object detection device including at least one image capture element can capture image data in a field of view and detect types of objects located in that region. Information such as a direction of travel or speed of the object may be used to determine a relative position of the object of interest, for example relative to the object detection device or a target object. The data from multiple devices for a region can be aggregated such that objects can be tracked as they move though the region. Information about the relative position of the object of interest can be used to trigger alerts to users in the area.

20 Claims, 18 Drawing Sheets

(56) References Cited

U.S. PATENT DOCUMENTS

2011/0141296 A1   6/2011  Yumiki
2016/0210852 A1   7/2016  Buchholz et al.
2016/0325680 A1  11/2016  Curtis et al.
2017/0084178 A1   3/2017  Jain et al.

* cited by examiner

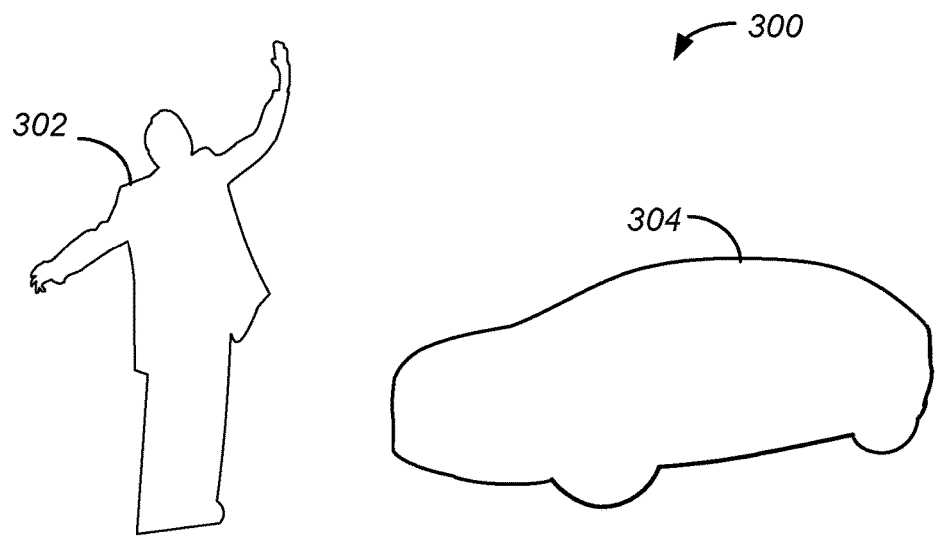
FIG. 3A
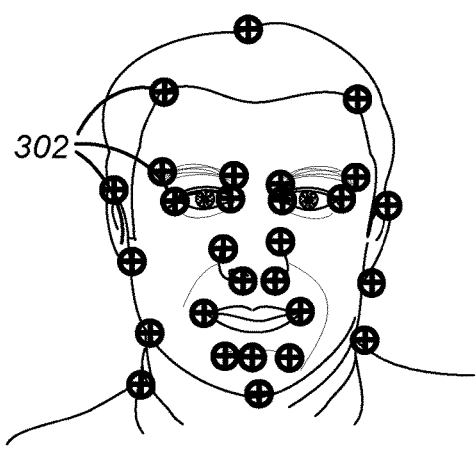
FIG. 3B
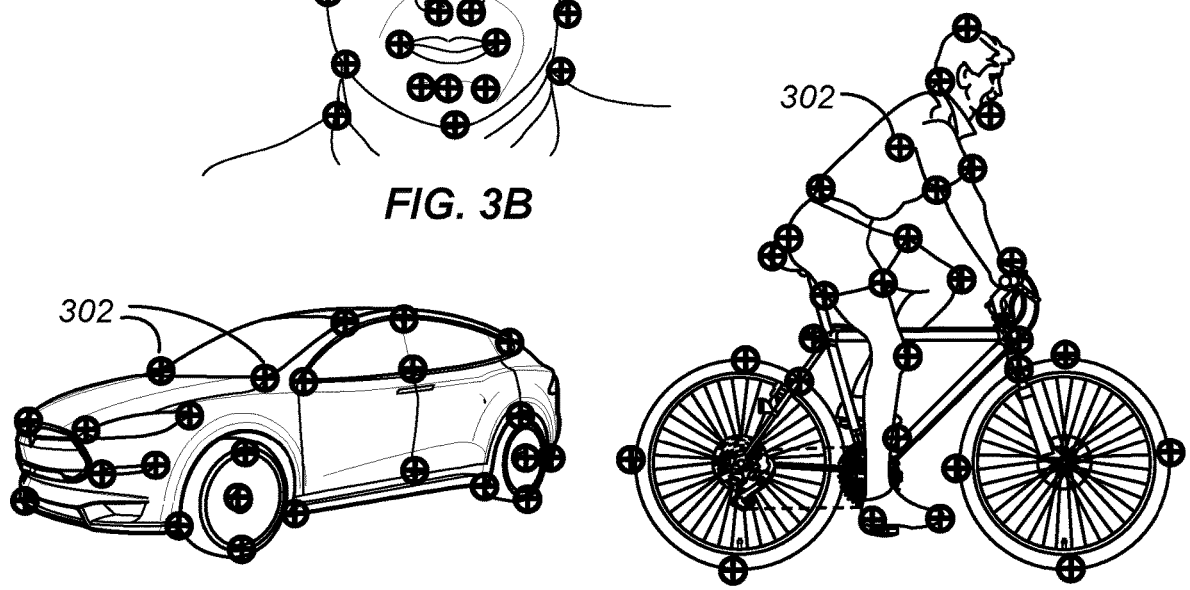
FIG. 3C
FIG. 3D

EVENT MONITORING WITH OBJECT DETECTION SYSTEMS

BACKGROUND

Entities are increasingly using digital video to monitor various locations. This can be used to monitor occurrences such as traffic congestion or the actions of people in a particular location. One downside to such an approach is that many approaches still require at least some amount of manual review, which can be expensive and prone to detection errors. In other approaches the video can be analyzed by a set of servers to attempt to detect specific information. Such an approach can be very expensive, however, as a significant amount of bandwidth is needed to transfer the video to the data center or other location for analysis. Further, the analysis is performed offline and following capture and transmission of the video data, which prevents any real-time action from being taken in response to the analysis.

BRIEF DESCRIPTION OF THE DRAWINGS

Various embodiments in accordance with the present disclosure will be described with reference to the drawings which are described as follows.

FIGS. 3A, 3B, 3C, and 3D illustrate features of objects identified in image data that can be utilized in accordance with various embodiments.

DETAILED DESCRIPTION

Figure 1:
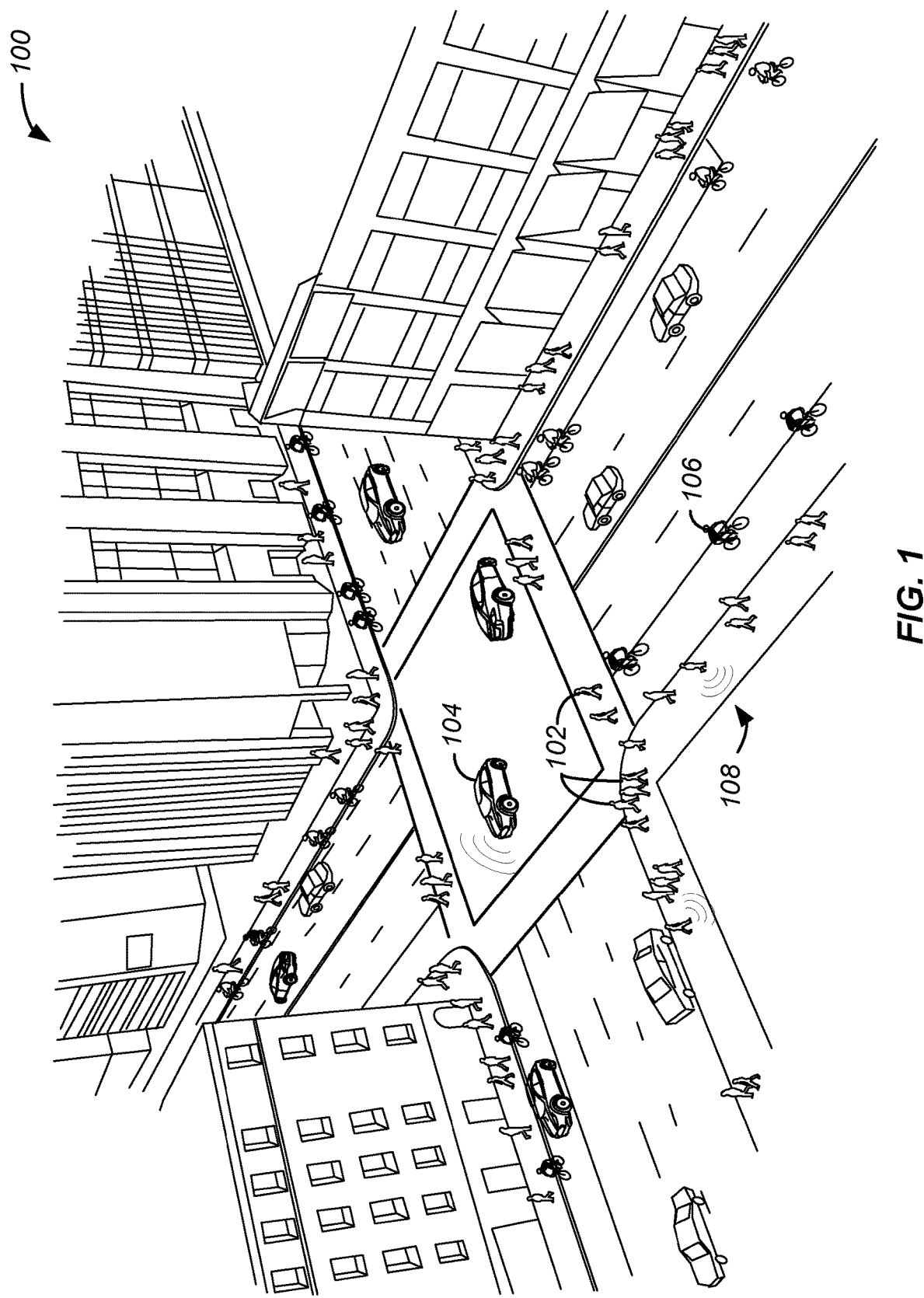
FIG. 1 illustrates an example environment in which embodiments of the present disclosure can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to monitor occurrences at various locations. In particular, various embodiments provide mechanisms for locating objects of interest, such as people, vehicles, or other detectable objects. Various embodiments enable these items to be detected, identified, counted, tracked, monitored, and/or otherwise accounted for through the use of, for example, captured image data. The image data (or other sensor data) can be captured using one or more detection devices as described herein, among other such devices and systems, and the image data may be processed in order to identify an occurrence or event associated with one or more captured items in the image data. Various other functions and advantages are described and suggested below as may be provided in accordance with the various embodiments.

There can be many situations where it may be desirable to receive an alert or indication of one or more events or occurrence involving one or more objects of interest. Such events or occurrences may include upcoming traffic incidents, objects of interest traveling toward a user or reference point at high speed, impending interactions between objects of interest and a user or reference point, and the like. Notifications regarding these upcoming events or occurrences may be useful to know in real or near-real time (e.g., without significant delay) to enable a user or object, such as an autonomous vehicle, to react. Conventional image or video analysis approaches require the captured image or video data to be transferred to a server or other remote system for analysis. As mentioned, this uses significant bandwidth and causes the data to be analyzed offline and after the transmission, which prevents actions from being initiated in response to the analysis in near real time. Further, in many instances it will be undesirable, and potentially unlawful, to collect information about the locations, movements, and actions of specific people. Thus, transmission of the video data for analysis may not be a viable solution. There are various other deficiencies to conventional approaches to such tasks as well.

Accordingly, approaches in accordance with various embodiments provide systems, devices, methods, and software, among other options, that can provide for the near real time detection and/or tracking of specific types of objects, as may include people, vehicles, products, and the like. Other types of information can be provided that can enable actions to be taken in response to the information while those actions can make an impact, and in a way that does not disclose information about the persons represented in the captured image or video data, unless otherwise instructed or permitted. Various other approaches and advantages will be appreciated by one of ordinary skill in the art in light of the teachings and suggestions contained herein.

FIG. 1 illustrates an environment 100 that corresponds to an urban area, such as may include roads, intersections, sidewalks, buildings, and other such features. There may be many objects that move within this environment, as may include pedestrians 102, automotive vehicles 104, bicycles 106, and the like. Some of these objects may emit audio and/or radio signals 108 or data, such as speech from a person, a detectable cell phone signal, a wireless data signal (i.e., Wi-Fi or Bluetooth®) from a vehicle or mobile device, engine noise, etc. At least some of these objects may be of interest to various persons or entities for a variety of reasons. For example, a traffic agency might be interested in the amount of traffic at any given time, including summary data such as direction of traffic flow, congestion points, as well as variations in traffic over time. A traffic agency might also be interested in temporary deviations from these patterns, such as may result from accidents, events, or other such occurrences. An agency also may be interested in a breakdown of the types of vehicles, such as the percentage of vehicles that correspond to taxies or commercial vehicles versus consumer vehicles.

Similarly, a government or city agency or department might be interested in obtaining such information for other types of traffic, such as pedestrian or bicycle traffic. This can include determining directions of motion, congestion points, behavior patterns, density, and other such information. This information can be useful in determining, for example, places for new crosswalks or bike lanes, or changes needed to crossing lights in order to improve daily movement of the pedestrians, bikes, Segways, skateboards, and other such objects of interest. This information can also help to identify location in greater numbers than usual, or running away from a specific location or region, among other such deviations from standard or observed behavior.

In addition to movement, traffic, and incident data that may be of interest to people such as cities or government agencies, such information can be useful to other types of entities as well. For example, in certain embodiments, the automotive vehicles 104 illustrated in FIG. 1 may be autonomous such that control of one or more aspects of the vehicle operation is operated by the vehicle 104 itself without intervention from passengers within the vehicle 104. In operation, the autonomous vehicles 104 may receive information and utilize that information to determine whether or not to react. For example, the autonomous vehicle 104 may receive data suggesting that a particular lane of traffic is moving slowly, and as such, the vehicle 104 may steer out of that lane of traffic and into one with less congestion. Additionally, the vehicle 104 may receive an alert that an emergency vehicle is approaching from the rear and thereafter decide how to react, such as by moving out of the way of the emergency vehicle. It should be appreciated that in embodiments disclosed herein information or data transmitted to one or more objects or users may be utilized by the objects or users independently. That is, the objects or users receive the information and determine how to react to the information rather than receiving a direct command from a third party service.

Additionally, information related to movement, traffic, and incident data may be of interest to users, such as pedestrians 102. For example, one or more alerts regarding an event or occurrence may be transmitted to a user device carried by the pedestrians 102. These alerts can correspond to a number of events, such as an impending interaction with an object of interest, an emergency, a dangerous location, or the like. The pedestrians 102 may receive these alerts and thereafter decide how to react. For instance, the pedestrian 102 may receive an alert of a fire in a building down the street. As such, the pedestrian 102 may decide to go in the opposite direction away from the fire, thereby decreasing congestion for emergency personnel. In other embodiments, the pedestrian 102 may receive an alert of a vehicle operating in an area that typically does not receive vehicular traffic or operating at an unexpected speed. As a result, the pedestrian 102 may decide to seek shelter, for example in a nearby building. In this manner, local events may be quickly distributed to those in the immediate or surrounding areas to enable real or near real-time actions.

Figure 2A:
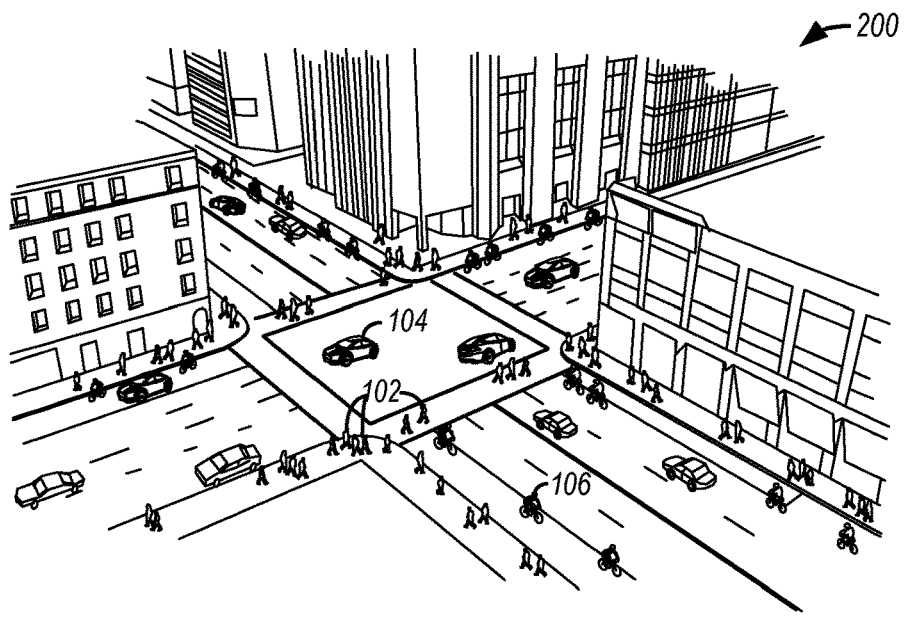
FIGS. 2A, 2B, and 2C illustrate an example process for locating foreground objects in image data that can be utilized in accordance with various embodiments.
Figure 2B:
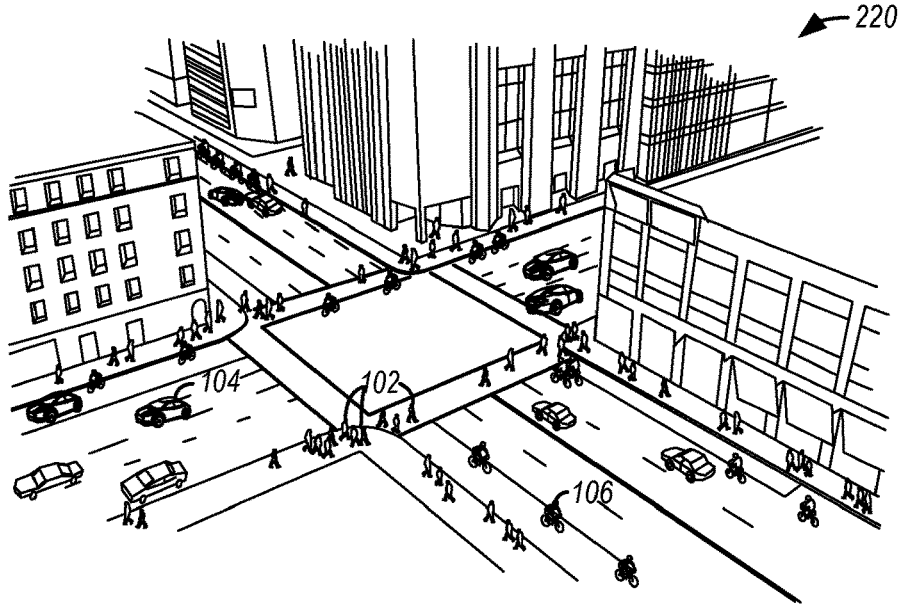
Figure 2C:
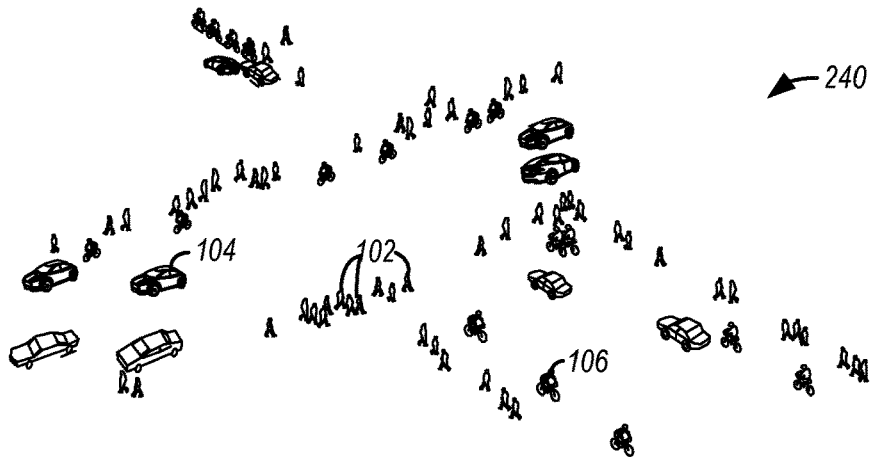

FIGS. 2A-2C illustrate example environments that corresponds to an urban area, such as may include roads, intersections, sidewalks, buildings, and other such features. For example, FIG. 2A shows the example environment 200 that includes a significant number of stationary objects, as may relate to sidewalks, roads, buildings, stoplights, traffic signs, bus stops, and the like. These objects that generally do not move over time can be considered background objects, such that these objects can be discerned from objects of interest in the foreground that move with respect to these background objects.

Since the objects of interest (e.g., persons, dogs, cars, bicycles) will generally move over a period of time, these objects can be identified based at least in part upon their movement in some embodiments. While approaches such as computer vision can be used to analyze an entire scene of data, such as an image of the entire environment 200 illustrated in FIG. 2A, such approaches can be relatively processor and memory intensive. If the image is captured by a device such as an object detection device that may be positioned at locations throughout the environment 200, that object detection device might have relatively limited processing and/or memory capacity, such that running a computer vision algorithm on full resolution, full color video data may not be possible, or may not be able to be performed with sufficient frequency for at least some applications. While the video or image data can be transmitted to a remote system or service for sufficient processing, memory, and other resource capacity for performing computer vision and object recognition, for example, the bandwidth required might exceed the available connection capacity, or a sufficient connection might not be able to be reliable and consistently obtained, among other potential issues. Further, if the analyzed data is being transmitted to a user device, such as a cell phone, it may be undesirable to send large data packets to the user device when the user device may be associated with a network that places restrictions on bandwidth usage and/or increases costs associated with heavy bandwidth usage. Therefore, it can be desirable to minimize the amount of processing that is to be performed on the object detection device itself and/or to limit the quantity of data transmitted to the user.

One way to minimize the amount of processing to be performed on the object detection device is to remove, subtract out, or otherwise ignore portions of the image data that correspond to background objects or regions. As mentioned, the background generally will remain stationary in the captured image data, at least where the image data is captured from a single point of view. For instance, the state of the environment 220 illustrated in FIG. 2B shows the locations of the objects of interest at some time t after the state of the environment 200 illustrated in FIG. 2A. As can be seen, the majority of the pedestrians 102, vehicles 104, and bicycles have changed positions and/or orientations between figures. It should be pointed out that reference numbers may be carried over between figures for purposes of simplicity or explanation, but such usage should not be interpreted as a limitation on the scope of the various embodiments unless otherwise specifically stated.

If image data is captured for both states of the environment 200, 220, and additional image data may be available for comparison, the portions of the image data that correspond to background can be determined, and those can be removed (or ignored) from the image data in order to leave remaining those portions of the image data that correspond to the "foreground" objects. If a set of images or video is available for the environment, and the environment is viewed from a determined viewpoint, such as a location where the object detection device is mounted, then the expected pixel values for each pixel location of an image will have an average value that corresponds to the color, intensity, or other such factors of the background at that location. Although a pair of images such as those for FIGS. 2A and 2B can be used, a larger sampling of images can provide for more accurate average value for each pixel position. If the image data for FIG. 2B has the average values for the background subtracted from the values of each corresponding pixel location, the remaining portions 240 of the image data will correspond to those portions of the image data that do not correspond to background regions or objects, as the subtraction did not result in pixel values of approximately zero. It should be understood that lighting, shadow, motion, intensity, and other factors can affect the actual values after subtraction, such that there can be a threshold or range set around a zero pixel value after subtraction such that pixels with pixel values within a threshold value of zero will be considered background in at least some embodiments. The remaining portions 240 will correspond to "blobs" of image data, or contiguous pixel regions, that each correspond to a determined foreground object, or a potential object of interest. In this way, the computer vision, object recognition, or other such process need only consider the regions of the foreground objects as illustrated in FIG. 2C, as opposed to the full image data of FIG. 2B. An advantage to looking at the image data over time and performing an average is that the process tends to minimize the effect of temporary obstructions, lighting variations, noise, and other such factors that can temporarily affect the pixel values for various locations.

Various other approaches can be used for purposes of background subtraction, or foreground detection, as well within the scope of the various embodiments. For example, some amount of image pre-processing can be performed for purposes of improving the quality of the image, as may include filtering out noise, adjusting brightness or contrast, etc. In cases where the camera might be moving, some amount of position or motion compensation may be performed as well. Background subtraction approaches that can be utilized with various embodiments include mean filtering, frame differencing, Gaussian average processing, background mixture modeling, mixture of Gaussians (MoG) subtraction, and the like. Libraries such as the OPEN CV library can also be utilized to take advantage of the conventional background and foreground segmentation algorithm.

Once the foreground portions or "blobs" of image data are determined, those portions can be processed using a computer vision algorithm for object recognition or other such process. Object recognition typically makes use of one or more classifiers that have been trained to recognize specific types of categories of objects, such as people, cars, bicycles, and the like. Algorithms used for such purposes can include convolutional neural networks, as may utilize one or more feature extraction libraries for identifying types of feature points of various objects. In some embodiments, a histogram or oriented gradients (HOG)-based approach uses feature descriptors for object detection, such as by counting occurrences of gradient orientation in localized portions of the image data. Other approaches that can be used take advantage of features such as edge orientation histograms, shape contexts, and scale-invariant feature transform descriptors, although these approaches may not provide the same level of accuracy for at least some data sets.

In some embodiments, an attempt to classify objects that does not require precision can rely on the general shapes of the blobs or foreground regions. For example, in the example foreground region 300 of FIG. 3A, there are two blobs that correspond to different types of objects. The first blob 302 has an outline that a classifier might indicate corresponds to a human with 85% certainty. Certain classifiers might provide multiple confidence or certainty values, such that the scores provided might indicate an 85% likelihood that the blob corresponds to a human and a 5% likelihood that the blob corresponds to an automobile, based upon the correspondence of the shape to the range of possible shapes for each type of object, which in some embodiments can include different poses or angles, among other such options. Similarly, the second blob 304 has a shape that a trained classifier could indicate has a high likelihood of corresponding to a vehicle. For situations where the objects are visible over time, such that additional views and/or image data can be obtained, the image data for various portions of each blob can be aggregated, averaged, or otherwise processed in order to attempt to improve precision and confidence. As mentioned elsewhere herein, the ability to obtain views from two or more different cameras can help to improve the confidence of the object recognition processes.

Where more precise identifications are desired, the computer vision process used can attempt to locate specific feature points as discussed above. As examples, FIGS. 3B, 3C, and 3D illustrate portions of a human, a vehicle, and a bicycle, respectively. As mentioned, different classifiers can be used that are trained on different data sets and/or utilize different libraries, where specific classifiers can be utilized to attempt to identify or recognize specific types of objects. For example, a human classifier might be used with a feature extraction algorithm to identify specific feature points 302 of a foreground object, and then analyze the spatial relations of those feature points to determine with at least a minimum level of confidence that the foreground object corresponds to a human. The feature points located can correspond to any features that are identified during training to be representative of a human, such as facial features and other features representative of a human in various poses. Similar classifiers can be used to determine the feature points 302 of other foreground object in order to identify those objects as vehicles, bicycles, or other objects of interest. If an object is not identified with at least a minimum level of confidence, that object can be removed from consideration, or a drone or other device can attempt to obtain additional data in order to attempt to determine the type of object with higher confidence. In some embodiments the image data can be saved for subsequent analysis by a computer system or service with sufficient processing, memory, and other resource capacity to perform a more robust analysis.

After processing using a computer vision algorithm with the appropriate classifiers, libraries, or descriptors, for example, a result can be obtained that is an identification of each potential object of interest with associated confidence value(s). One or more confidence thresholds or criteria can be used to determine which objects to select as the indicated type. The setting of the threshold value can be a balance between the desire for precision of identification and the ability to include objects that appear to be, but may not be, objects of a given type. For example, there might be 1,000 people in a scene. Setting a confidence threshold too high, such as at 99%, might result in a count of around 100 people, but there will be a very high confidence that each object identified as a person is actually a person. Setting a threshold too low, such as at 50%, might result in too many false positives being counted, which might result in a count of 1,500 people, one-third of which do not actually correspond to people. For applications where approximate counts are desired, the data can be analyzed to determine the appropriate threshold where, on average, the number of false positives is balanced by the number of persons missed, such that the overall count is approximately correct on average. For many applications this can be a threshold between about 60% and about 85%, although as discussed the ranges can vary by application or situation.

The ability to recognize certain types of objects of interest, such as pedestrians, bicycles, and vehicles, enables various types of data to be determined that can be useful for a variety of purposes. As mentioned, the ability to count the number of cars stopped at an intersection or people in a crosswalk can help to determine the traffic in a particular area, and changes in that count can be monitored over time to attempt to determine density or volume as a factor of time. Tracking these objects over time can help to determine aspects such as traffic flow and points of congestion. Determining irregularities in density, behavior, or patterns can help to identify situations such as accidents or other unexpected incidents. Thereafter, this information may be transmitted to a vehicle, such as an autonomous vehicle, which may then determine how to analyze the data. For instance, the vehicle may take a different route due to a traffic accident.

The ability to obtain the image data and provide data regarding recognized objects could be offered as a stand-alone system that can be operated by agencies or entities such as traffic departments and other governmental agencies. The data also can be provided as part of a service, whereby an organization collects and analyzes the image data, and provides the data as part of a one-time project, ongoing monitoring project, or other such package. The customer of the service can specify the type of data desired, as well as the frequency of the data or length of monitoring, and can be charged accordingly. In some embodiments the data might be published as part of a subscription service, whereby a mobile app provider or other such entity can obtain a subscription in order to publish or obtain the data for purposes such as navigation and route determination. Such data also can be used to help identify accidents, construction, congestion, and other such occurrences.

As mentioned, many of the examples herein utilize image data captured by one or more cameras with a view of an area of interest. In at least some embodiments these cameras can be provided using one or more object detection devices, which can each include one or more cameras or other sensors for capturing the image data. These can include, for example, digital still cameras, digital video cameras, infrared detectors, stereoscopic cameras, thermal sensors, motion sensors, proximity sensors, and other such sensors or components. The image data can include one or more images, or video, indicating pixel values for pixel locations of the camera sensor, for example, where the pixel values can represent data such as the intensity or color of ambient, infrared IR, or ultraviolet (UV) radiation detected by the sensor.

Figure 4:
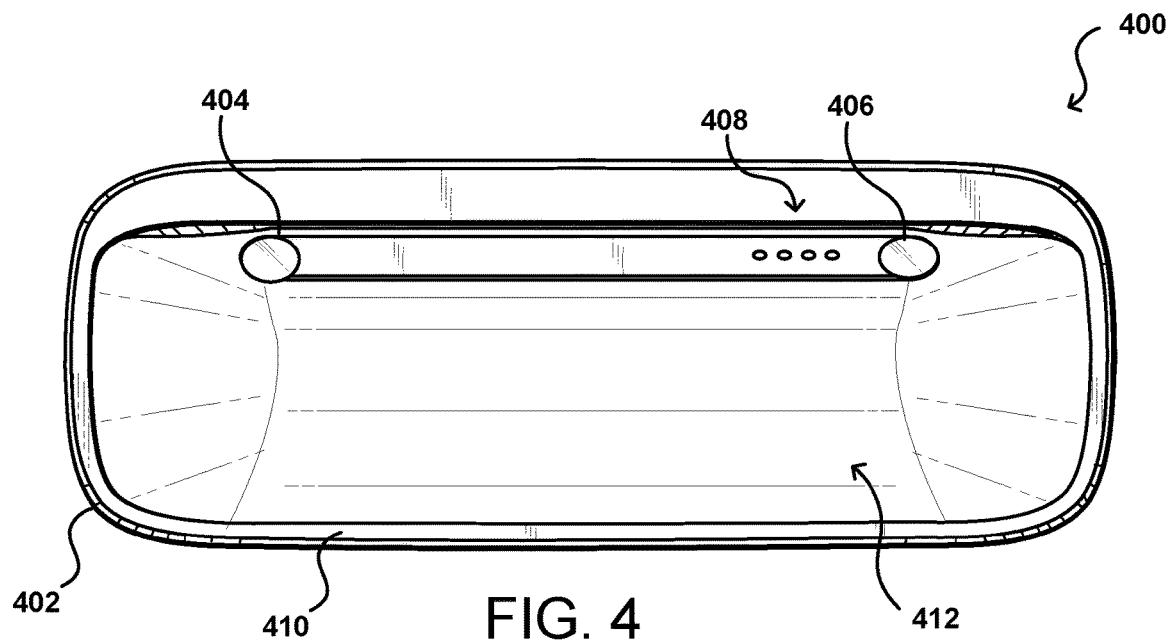
FIG. 4 illustrates a front view of an embodiment of an object detection device that can be utilized in accordance with various embodiments.

In various embodiments, an object detection device 400 (e.g., detection device) can be used such as that illustrated in the front view of FIG. 4. In many situations there will be more than one device positioned about an area in order to cover views of multiple partially overlapping regions, to provide for a larger capture area and multiple capture angles, among other such advantages. Each detection device can be mounted in an appropriate location, such as on a pole or wall proximate the location of interest, where the mounting can be fixed, removable, or adjustable, among other such options. As discussed elsewhere herein, an example detection device can also be mounted directly on a window or similar surface enabling the device to capture image data for light passing through the window from, for example, the exterior of a building. The detection device 400 illustrated includes a pair of cameras 404, 406 useful in capturing two sets of video data with partially overlapping fields of view which can be used to provide stereoscopic video data. The cameras 404, 406 are positioned at an angle such that when the device is positioned in a conventional orientation, with the front face 410 of the device being substantially vertical, the cameras will capture video data for items positioned in front of, and at the same height or below, the position of the cameras. As known for stereoscopic imaging, the cameras can be configured such that their separation and configuration are known for disparity determinations. Further, the cameras can be positioned or configured to have their primary optical axes substantially parallel and the cameras rectified to allow for accurate disparity determinations. It should be understood, however, that devices with a single camera or more than two cameras can be used as well within the scope of the various embodiments, and that different configurations or orientations can be used as well. Various other types of image sensors can be used as well in different devices. The device casing can have a concave region 412 or other recessed section proximate the cameras 404, 406 such that the casing does not significantly impact or limit the field of view of either camera. The shape of the casing near the camera is also designed, in at least some embodiments, to provide a sufficiently flat or planar surface surrounding the camera sensors such that the device can be placed flush against a window surface, for example, while preventing reflections from behind the sensor from entering the lenses as discussed in more detail elsewhere herein.

The example detection device 400 of FIG. 4 includes a rigid casing 402 made of a material such as plastic, aluminum, or polymer that is able to be mounted indoors or outdoors, and may be in a color such as black to minimize distraction. In other situations where it is desirable to have people be aware that they are being detected or tracked, it may be desirable to cause the device to have bright colors, flashing lights, etc. The example device 402 also has a set 408 of display lights, such as differently colored light-emitting diodes (LEDs), which can be off in a normal state to minimize power consumption and/or detectability in at least some embodiments. If required by law, at least one of the LEDs might remain illuminated, or flash illumination, while active to indicate to people that they are being monitored. The LEDs 408 can be used at appropriate times, such as during installation or configuration, trouble shooting, or calibration, for example, as well as to indicate when there is a communication error or other such problem to be indicated to an appropriate person. The number, orientation, placement, and use of these and other indicators can vary between embodiments. In one embodiment, the LEDs can provide an indication during installation of power, communication signal (e.g., LTE) connection/strength, wireless communication signal (e.g., WiFi or Bluetooth®) connection/strength, and error state, among other such options.

Figure 5:
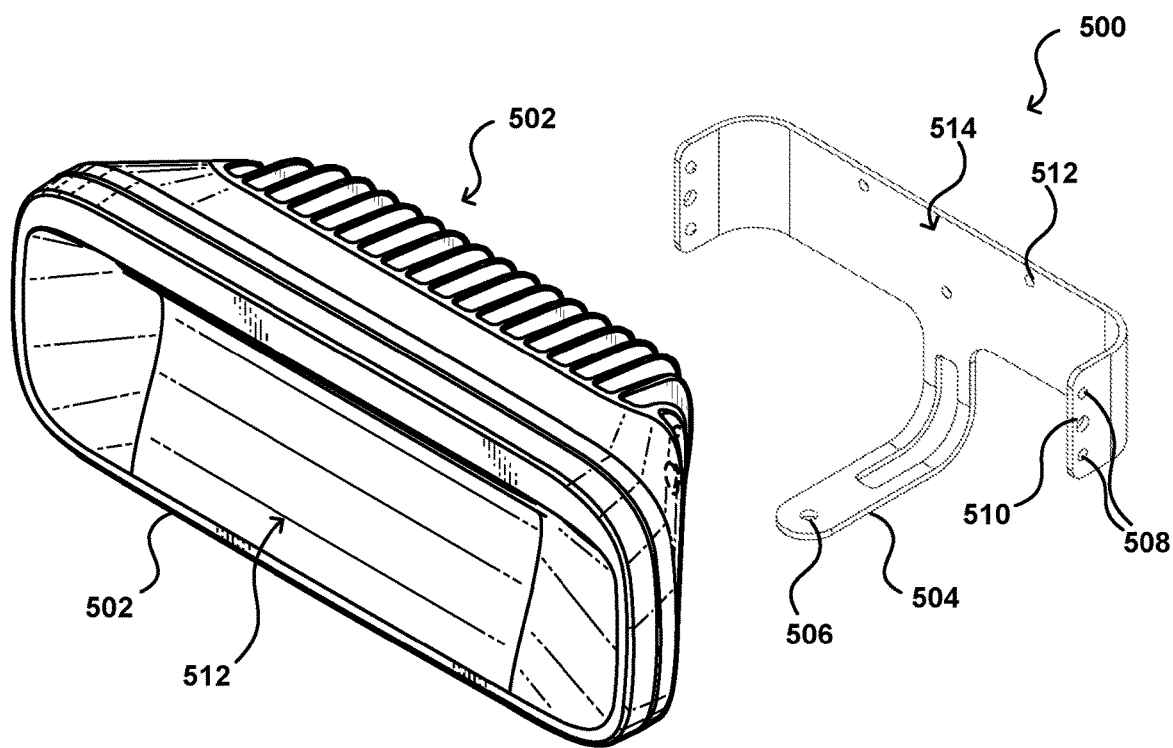
FIG. 5 illustrates a perspective view of an embodiment of an object detection device and mounting bracket that can be utilized in accordance with various embodiments.

FIG. 5 illustrates a perspective view 500 of an example detection device. This view provides perspective on a potential shape of the concave region 412 that prevents blocking a portion of the view of view of the stereo cameras as discussed with respect to FIG. 4. Further, this view illustrates that the example device includes an incorporated heat sink 502, or set of heat dissipation fins, positioned on a back surface of the detection device. The arrangement, selection, and position of the heat sink(s) can vary between embodiments, and other heat removal mechanisms such as fans can be used as well in various embodiments. The fins can be made from any appropriate material capable of transferring thermal energy from the bulk device (and thus away from the heat generating and/or sensitive components such as the processors). The material can include, for example, aluminum or an aluminum alloy, which can be the same material or a different material from that of the primary casing or housing 402. It should also be understood that the casing itself may be made from multiple materials, such as may include a plastic faceplate on an aluminum housing.

As illustrated, the housing 402 in some embodiments can also be shaped to fit within a mounting bracket 504 or other such mounting apparatus. The mounting bracket can be made of any appropriate materials, such as metal or aluminum, that is sufficiently strong to support the detection device. In this example the bracket can include various attachment mechanisms, as may include openings 506, 512 (threaded or otherwise) for attachment screws or bolts, as well as regions 504, 514 shaped to allow for mounting to a wall, pole, or tripod, among other such options. The bracket illustrated can allow for one-hand installation, such as where the bracket 504 can be screwed to a pole or wall. The detection device 502 can then be installed by placing the detection device into the mounted bracket 504 until dimples 508 extending from the bracket are received into corresponding recesses in the detection device (or vice versa) such that the detection device 502 is held in place on the bracket. This can allow for relatively easy one-handed installation of the device in the bracket, particularly useful when the installation occurs from a ladder to a bracket mounted on a pole or other such location. Once held in place, the device can be securely fastened to the bracket using one or more safety screws, or other such attachment mechanisms, fastened through corresponding openings 510 in the mounting bracket. Various other approaches for mounting the detection device in a bracket, or using a bracketless approach where the device is mounted directly to a location, can be used as well within the scope of the various embodiments. Another example mounting approach involves using double-sided tape, or another such adhesive material, with a pre-cut stencil. One side of the tape can be applied to the casing of the detection device during manufacture and assembly, for example, such that when installation is to occur one can peel off or remove an outer silicone paper and press the exposed adhesive on the tape carrier material directly to a window or other light-transmissive surface. As discussed, such an approach can enable the face or lip region of the front of an example device to a window in order for the two cameras 404, 406 to capture light passing through the window glass. The adhesive will also help to form a seal such that external light does not leak into the camera region and get detected by the relevant sensors. Further, while in some embodiments the detection device will include a power cord (or port to receive a power cord), in other embodiments the bracket can function as a docking station wherein a power port on the device mates with a power connection on the bracket (or vice versa) in order to power the device. Other power sources such as battery, solar cells, or wireless charging can be used as well within the scope of the various embodiments.

Figure 6:
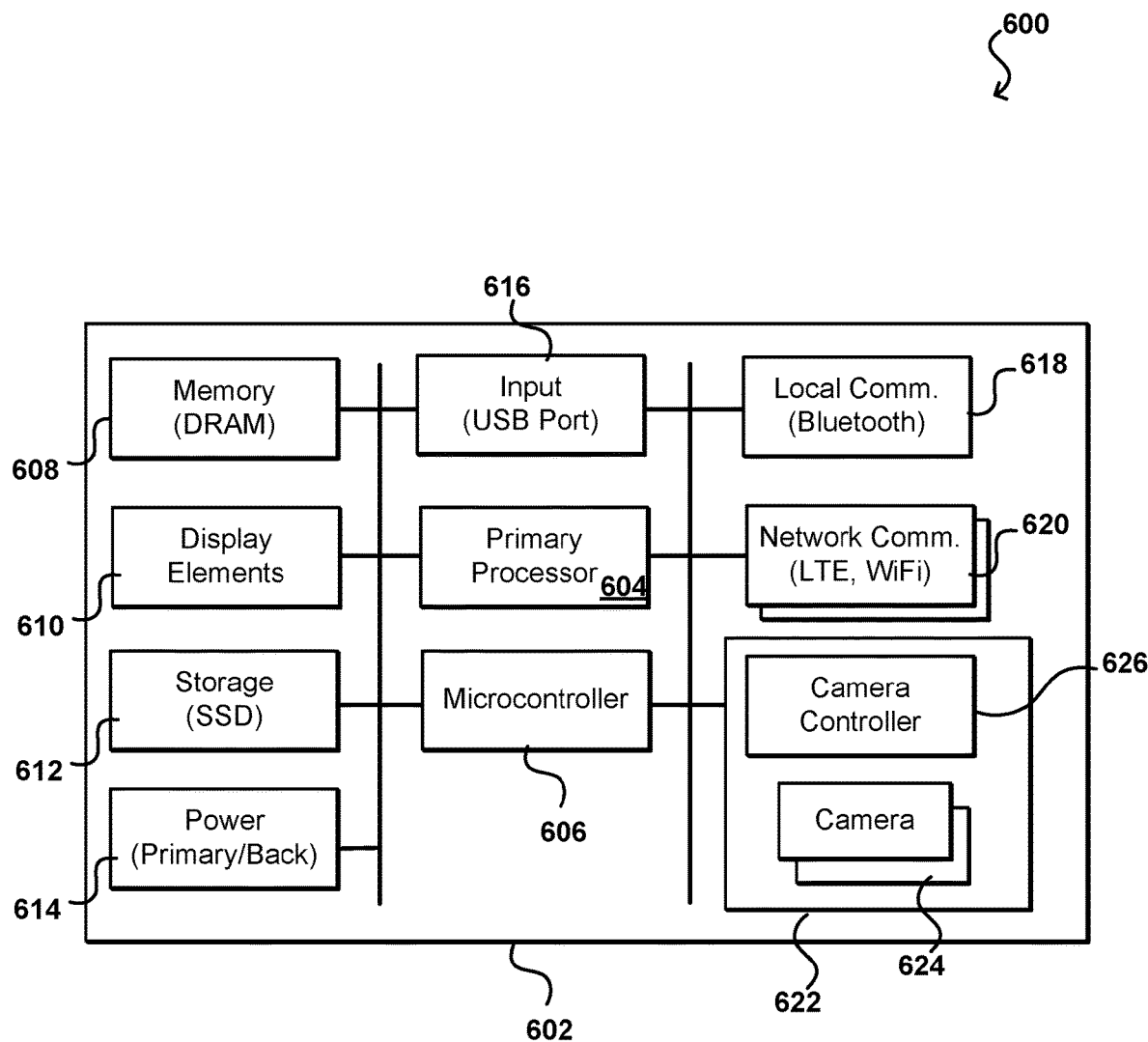
FIG. 6 illustrates an example system diagram of an object detection device that can be utilized in accordance with various embodiments.

FIG. 6 illustrates an example set of components 600 that can be utilized in an example detection device in accordance with various embodiments. In this example, at least some of the components would be installed on one or more printed circuit boards (PCBs) 602 contained within the housing of the device. Elements such as the display elements 610 and cameras 624 can also be at least partially exposed through and/or mounted in the device housing. In this example, a primary processor 604 (e.g., at least one CPU) can be configured to execute instructions to perform various functionality discussed herein. The device can include both random access memory 608, such as DRAM, for temporary storage and persistent storage 612, such as may include at least one solid state drive SSD, although hard drives and other storage may be used as well within the scope of the various embodiments. In at least some embodiments, the memory 608 can have sufficient capacity to store frames of video content from both cameras 624 for analysis, after which time the data is discarded. The persistent storage 612 may have sufficient capacity to store a limited amount of video data, such as video for a particular event or occurrence detected by the device, but insufficient capacity to store lengthy periods of video data, which can prevent the hacking or inadvertent access to video data including representations of the people contained within the field of view of those cameras during the period of recording.

The detection device can include at least one display element 610. In various examples this includes one or more LEDs or other status lights that can provide basic communication to a technician or other observer of the device. It should be understood, however, that screens such as LCD screens or other types of displays can be used as well within the scope of the various embodiments. In at least some embodiments one or more speakers or other sound producing elements can also be included, which can enable alarms or other type of information to be conveyed by the device. Similarly, one or more audio capture elements such as a microphone can be included as well. This can allow for the capture of audio data in addition to video data, either to assist with analysis or to capture audio data for specific periods of time, among other such options. As mentioned, if a security alarm is triggered the device might capture video data (and potentially audio data if a microphone is included) for subsequent analysis and/or to provide updates on the location or state of the emergency, etc. In some embodiments a microphone may not be included for privacy or power concerns, among other such reasons.

The detection device 602 can include various other components, including those shown and not shown, that might be included in a computing device as would be appreciated to one of ordinary skill in the art. This can include, for example, at least one power component 614 for powering the device. This can include, for example, a primary power component and a backup power component in at least one embodiment. For example, a primary power component might include power electronics and a port to receive a power cord for an external power source, or a battery to provide internal power, among solar and wireless charging components and other such options. The device might also include at least one backup power source, such as a backup battery, that can provide at least limited power for at least a minimum period of time. The backup power may not be sufficient to operate the device for length periods of time, but may allow for continued operation in the event of power glitches or short power outages. The device might be configured to operate in a reduced power state, or operational state, while utilizing backup power, such as to only capture data without immediate analysis, or to capture and analyze data using only a single camera, among other such options. Another option is to turn off (or reduce) communications until full power is restored, then transmit the stored data in a batch to the target destination. As mentioned, in some embodiments the device may also have a port or connector for docking with the mounting bracket to receive power via the bracket.

The device can have one or more network communications components 620, or subsystems, that enable the device to communicate with a remote server or computing system. This can include, for example, a cellular modem for cellular communications (e.g., LTE, 5G, etc.) or a wireless modem for wireless network communications (e.g., WiFi for Internet-based communications). The device can also include one or more components 618 for "local" communications (e.g., Bluetooth®) whereby the device can communicate with other devices within a given communication range of the device. Examples of such subsystems and components are well known in the art and will not be discussed in detail herein. The network communications components 620 can be used to transfer data to a remote system or service, where that data can include information such as count, object location, and tracking data, among other such options, as discussed herein. The network communications component can also be used to receive instructions or requests from the remote system or service, such as to capture specific video data, perform a specific type of analysis, or enter a low power mode of operation, etc. A local communications component 618 can enable the device to communicate with other nearby detection devices or a computing device of a repair technician, for example. In some embodiments, the device may additionally (or alternatively) include at least one input 616 and/or output, such as a port to receive a USB, micro-USB, FireWire, HDMI, or other such hardwired connection. The inputs can also include devices such as keyboards, push buttons, touch screens, switches, and the like.

The illustrated detection device also includes a camera subsystem 622 that includes a pair of matched cameras 624 for stereoscopic video capture and a camera controller 626 for controlling the cameras. Various other subsystems or separate components can be used as well for video capture as discussed herein and known or used for video capture. The cameras can include any appropriate camera, as may include a complementary metal-oxide-semiconductor (CMOS), charge coupled device (CCD), or other such sensor or detector capable of capturing light energy over a determined spectrum, as may include portions of the visible, infrared, and/or ultraviolet spectrum. Each camera may be part of an assembly that includes appropriate optics, lenses, focusing elements, shutters, and other such elements for image capture by a single camera, set of cameras, stereoscopic camera assembly including two matched cameras, or other such configuration. Each camera can also be configured to perform tasks such as autofocusing, zoom (optical or digital), brightness and color adjustments, and the like. The cameras 624 can be matched digital cameras of an appropriate resolution, such as may be able to capture HD or 4K video, with other appropriate properties, such as may be appropriate for object recognition. Thus, high color range may not be required for certain applications, with grayscale or limited colors being sufficient for some basic object recognition approaches. Further, different frame rates may be appropriate for different applications. For example, thirty frames per second may be more than sufficient for tracking person movement in a library, but sixty frames per second may be needed to get accurate information for a highway or other high speed location. As mentioned, the cameras can be matched and calibrated to obtain stereoscopic video data, or at least matched video data that can be used to determine disparity information for depth, scale, and distance determinations. The camera controller 626 can help to synchronize the capture to minimize the impact of motion on the disparity data, as different capture times would cause some of the objects to be represented at different locations, leading to inaccurate disparity calculations.

The example detection device 600 also includes a microcontroller 606 to perform specific tasks with respect to the device. In some embodiments, the microcontroller can function as a temperature monitor or regulator that can communicate with various temperature sensors (not shown) on the board to determine fluctuations in temperature and send instructions to the processor 604 or other components to adjust operation in response to significant temperature fluctuation, such as to reduce operational state if the temperature exceeds a specific temperature threshold or resume normal operation once the temperature falls below the same (or a different) temperature threshold. Similarly, the microcontroller can be responsible for tasks such as power regulation, data sequencing, and the like. The microcontroller can be programmed to perform any of these and other tasks that relate to operation of the detection device, separate from the capture and analysis of video data and other tasks performed by the primary processor 604.

Figure 7:
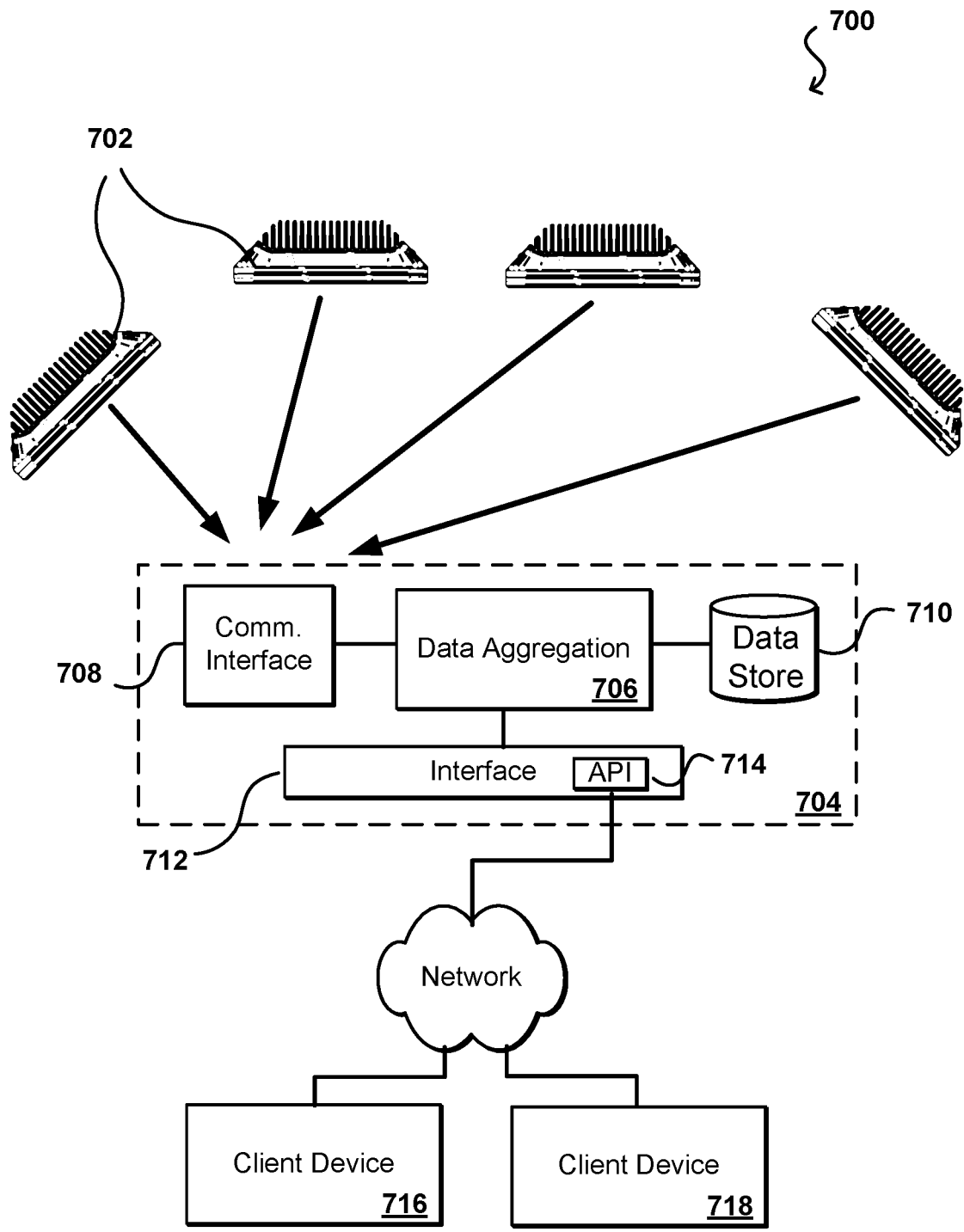
FIG. 7 illustrates an example implementation including a number of object detection devices that can be utilized in accordance with various embodiments.

FIG. 7 illustrates an example system implementation 700 that can utilize a set of detection devices in accordance with various embodiments. In this example, a set of detection devices 702 is positioned about a specific location to be monitored. This can include mounting the devices with a location and orientation such that areas of interest at the location are within the field of view of cameras of at least one of the detection devices. If tracking of objects throughout the areas is to be performed, then the detection devices can be positioned with substantially or minimally overlapping fields of view as discussed elsewhere herein. Each detection device can capture video data and analyze that data on the respective device. After analysis, each video frame can be discarded such that no personal or private data is subsequently stored on the device. Information such as the number of objects, types of objects, locations of objects, and movement of objects can be transmitted across at least one communication mechanism, such as a cellular or wireless network based connection, to be received to an appropriate communication interface 708 of a data service provider environment 704. In this example, the data service provider environment includes various resources (e.g., servers, databases, routers, load balancers, and the like) that can receive and process the object data from the various detection devices. As mentioned, this can include a network interface that is able to receive the data through an appropriate network connection. It should be understood that even if the data from the detection devices 702 is sent over a cellular connection, that data might be received by a cellular service provider and transmitted to the data service provider environment 704 using another communication mechanism, such as an Internet connection, among other such options.

The data from the devices can be received to the communication interface and then directed to a data aggregation server 706, or other such system or service, which can correlate the data received from the various detection devices 702 for a specific region or location. This can include not aggregating the data from the set of devices for a location, but potentially performing other tasks such as time sequencing, device location and overlap determinations, and the like. In some embodiments, such an approach can provide the ability to track a single object through overlapping fields of view of different devices as discussed elsewhere herein. Such a process can be referred to as virtual stitching, wherein the actual image or video data is not stitched together but the object paths or locations are "stitched" or correlated across a large area monitored by the devices. The data aggregation server 706 can also process the data itself, or in combination with another resource of (or external to) the environment 704, to determine appropriate object determination, correlation, count, movement, and the like. For example, if two detection devices have overlapping fields of view, then some objects might be represented in data captured by each of those two devices. The aggregation server 706 can determine that, based on the devices providing the data, the relative orientation and field overlap of the devices, and positions where the object is represented in both sets of data, that the object is the same object represented in both data sets. As mentioned elsewhere herein, one or more descriptor values may also be provided that can help correlate object between frames and/or different fields of view. The aggregation server can then correlate these representations such that the object is only counted once for that location. The aggregation server can also, in at least some embodiments, correlate the data with data from a previous frame in order to correlate objects over time as well. This can help to not only ensure that a single object is only counted once even though represented in multiple video frames over time, but can also help to track motion of the objects through the location where object tracking is of interest. In some embodiments, descriptors or other contextual data for an object (such as the determined hair color, age, gender, height, or shirt color) can be provided as well to help correlate the objects, since only time and coordinate data is otherwise provided in at least some embodiments. Other basic information may be provided as well, such as may include object type (e.g., person or car) or detection duration information. Information from the analysis can then be stored to at least one data store 710. The data stored can include the raw data from the devices, the aggregated or correlated data from the data aggregation server, report data generated by a reporting server or application, or other such data. The data stored in some embodiments can depend at least in part upon the preferences or type of account of a customer of the data service provider who pays or subscribes to receive information based on the data provided by the detection devices 802 at the particular location. In some embodiments, basic information such as the raw data is always stored, with count, tracking, report, or other data being configurable or selectable by one or more customers or other such entities associated with account.

In order to obtain the data, a request can be submitted from various client devices 716, 718 to an interface layer 712 of the data service provider environment. The interface can include any appropriate interface, such as may correspond to a network address or application programming interface (API). The communication interface 708 for communicating with the detection devices 708 can be part of, or separate from, this interface layer. In some embodiments the client devices 716, 718 may be able to submit requests that enable the detection device data to be sent directly to the client devices 716, 718 for analysis. The client devices can then use a corresponding user interface, application, command prompt, or other such mechanism to obtain the data. This can include, for example, obtaining the aggregated and correlated data from the data store or obtaining reports generated based on that data, among other such options. Customized reports or interfaces can be provided that enable customers or authorized users to obtain the information of interest. The client devices can include any appropriate devices operable to send and receive requests, messages, or information over an appropriate network and convey information back to a user of the device. Examples of such client devices include personal computers, smart phones, handheld messaging devices, wearable computers, desktop computers, notebook computers, tablets, and the like. Such an approach enables a user to obtain the data of interest, as well as to request further information or new types of information to be collected or determined. It should be understood that although many components are shown as part of a data service provider environment 704 that the components can be part of various different environments, associated with any of a number of different entities, or associated with no specific environment, among other such options.

In at least some embodiments at least one valid credential will need to be provided in order to access the data from the data service provider environment 704. This can include, for example, providing a username and password to be authenticated by the data service environment (or an identity management service in communication with the environment, for example) that is valid and authorized to obtain or access the data, or at least a portion of the data, under the terms of the corresponding customer account. In some embodiments a customer will have an account with the data service provider, and user can obtain credentials under permission from the customer account. In some embodiments the data may be encrypted before storage and/or transmission, where the encryption may be performed using a customer encryption key or asymmetric key pair, among other such options. The data may also be transferred using a secure transmission protocol, among other such options.

Figure 8:
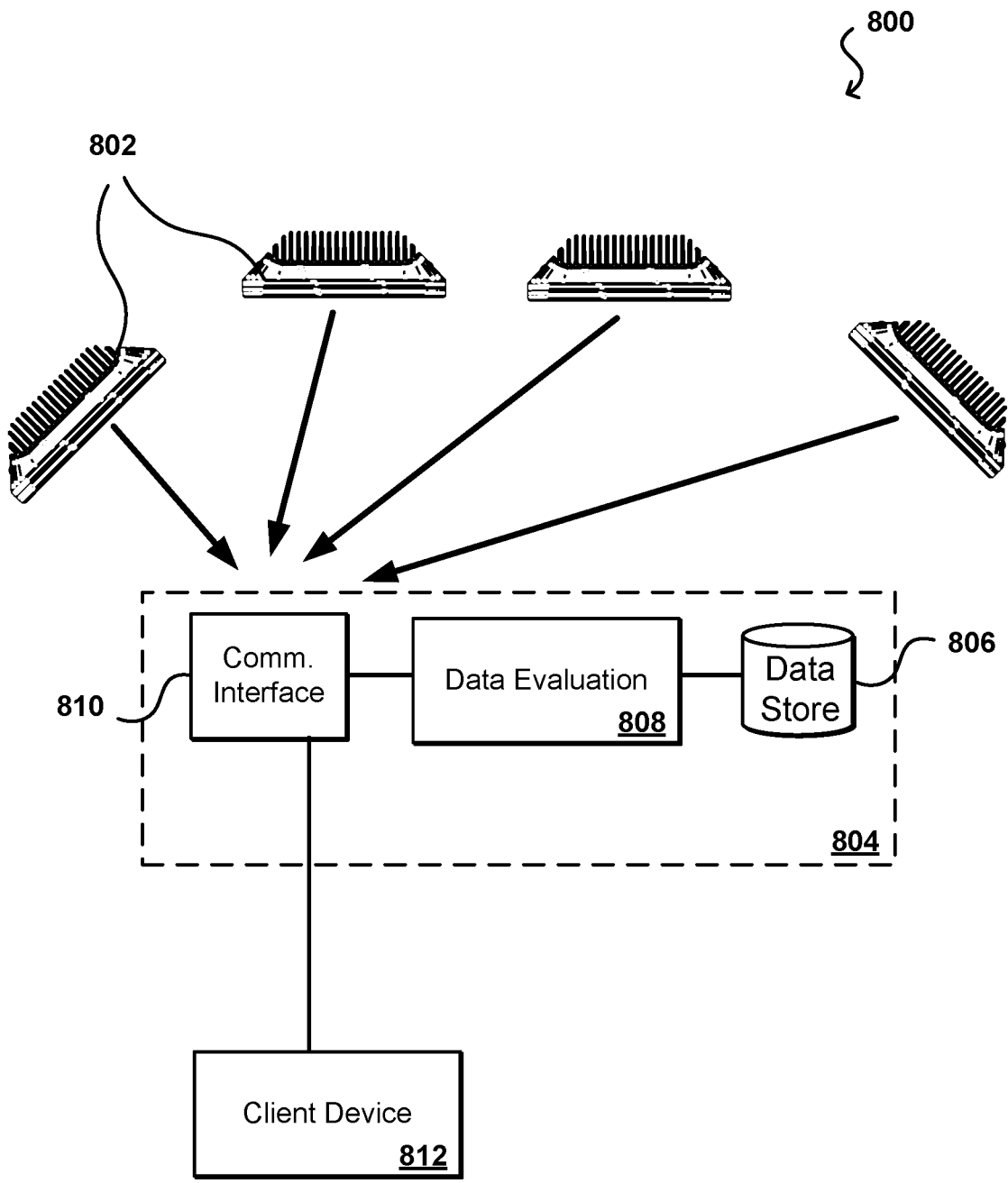
FIG. 8 illustrates an example implementation including a number of object detection devices that can be utilized in accordance with various embodiments.

FIG. 8 illustrates an example system implementation 800 that can utilize a set of detection devices in accordance with various embodiments. In this example, a set of detection devices 802 is positioned about a specific location to be monitored. This can include mounting the devices with a location and orientation such that areas of interest at the location are within the field of view of the cameras of at least one of the detection devices. If tracking of objects throughout the areas is to be performed, then the detection devices can be positioned with substantially or minimally overlapping fields of view as discussed elsewhere herein. Each detection device can capture video data and analyze that data on the respective device. After analysis, each video frame can be discarded such that no personal or private data is subsequently stored on the device.

In embodiments, the devices 802 include an onboard processing environment 804, which may be stored on the memory 606 and/or storage 612 described above. In this example, the data service provider environment includes various resources (e.g., servers, databases, routers, load balancers, and the like) that can receive and process the object data from the detection devices and/or enable the detection devices 802 to communicate with one another and/or a remote server, such as a server controlled by a provider. As mentioned, this can include a network interface that is able to receive the data through an appropriate network connection. It should be understood that even if the data from the detection devices 802 is sent over a cellular connection, that data might be received by a cellular service provider and transmitted to the data service provider environment 804 using another communication mechanism, such as an Internet connection, among other such options.

The data obtained from the devices can be received and stored in a data store 806. The data store 806 may store data for a period of time, for example 1 hour, before transmitting the data to offsite storage, for example on a remote server. In embodiments, the data store 806 also includes logical and/or instructions for analyzing one or more different occurrences or events. For example, upon detection of a vehicle there may be one or more different scenarios stored in the data store 806 that may be called upon by the data evaluation module 808. The data evaluation module 808 may receive the instructions from the data store 806 for processing of the image data received. As described above, upon detection of a vehicle the data evaluation module 808 may receive instructions for evaluating traffic flow conditions and determine whether one or more lanes of traffic are operating with greater efficiency than others. Or, in embodiments, if a user is a pedestrian and the object of interest detected is a vehicle the data evaluation module 808 may receive instructions to calculate a relative position of the vehicle compared to the pedestrian to determine the likelihood of a potential interaction. Upon determination of a potential event, the data may be transmitted to a communication interface 810.

As will be described below, a variety of occurrences or events may be stored on the device 802 via the data store 806. There events may be related to traffic conditions, potential emergency situations, or the like. For example, an event may be a traffic delay which evaluates traffic flow in one or more lanes and transmits the information to a user, for example in a vehicle or autonomous vehicle, for determination whether to change or lanes or modify a route. In another example embodiment, the event may be an emergency situation, such as a vehicle travelling at high speed through a pedestrian area. The object of interest may be the vehicle and the user may be a pedestrian. If the event is the likelihood of interaction between the vehicle and pedestrian, the instructions may include making a determination on the likelihood the vehicle and pedestrian will interact based on, for example, at least a relative position of the vehicle compared to the pedestrian. The relative position may include the speed and/or direction of travel of the vehicle. As such, a determination and alert may be transmitted to the pedestrian when the likelihood of the event occurring is above a threshold.

The communication interface 810 may enable communication between a client device 812 and/or the other objection detection devices 802. It should be appreciated that the communication interface 810 may be any type of transceiver, as described above, that enables data transmission, such as wirelessly via a cellular network, via a near field communication protocol, or the like. In some embodiments the client devices 812 may be able to submit requests that enable the detection device data to be sent directly to the client devices 812 for analysis. For example, the client devices 812 may have access to the data store 806. The client devices can then use a corresponding user interface, application, command prompt, or other such mechanism to obtain the data. This can include, for example, obtaining the aggregated and correlated data from the data store or obtaining reports generated based on that data, among other such options. The client devices can include any appropriate devices operable to send and receive requests, messages, or information over an appropriate network and convey information back to a user of the device. Examples of such client devices include personal computers, smart phones, handheld messaging devices, wearable computers, desktop computers, notebook computers, tablets, and the like. Such an approach enables a user to obtain the data of interest, as well as to request further information or new types of information to be collected or determined. It should be understood that although many components are shown as part of a processing environment 804 that the components can be part of various different environments, associated with any of a number of different entities, or associated with no specific environment, among other such options. It should be appreciated that features discussed with reference to FIGS. 7 and 8 may be interchangeable and/or combinable, but such description has been omitted for clarity and conciseness.

Figure 9:
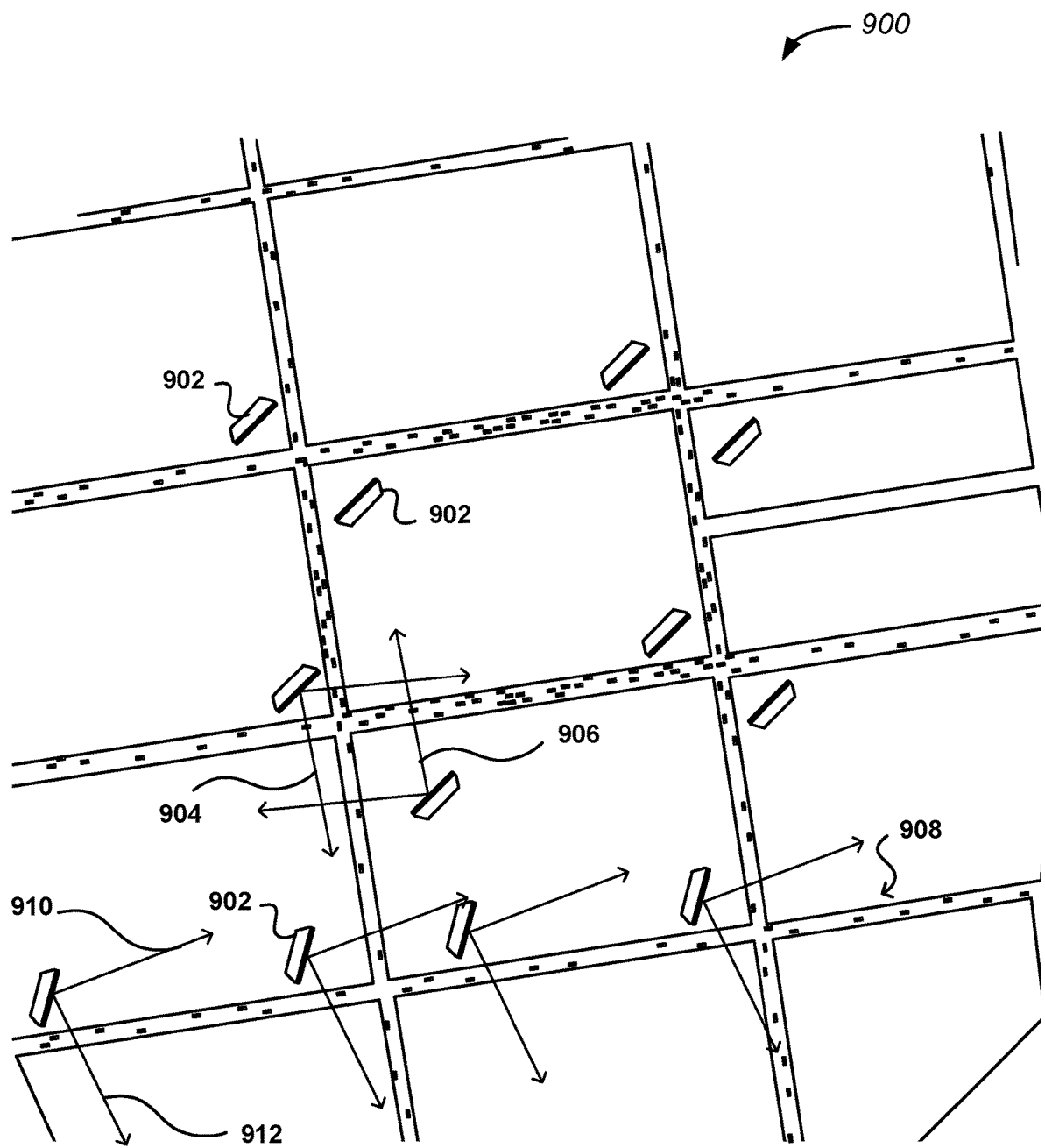
FIG. 9 illustrates an example implementation including a number of object detection devices that can be utilized in accordance with various embodiments.

FIG. 9 illustrates an example arrangement 900 of a plurality of detection devices 902 arranged about an urban environment, such as a city, including various roads. As shown, the detection devices 902 may be arranged in a variety of configurations to enable a field of view 904, 906 to cover a desired viewing area. In the illustrated embodiment, the devices 902 may be arranged on opposite sides of an intersection, such that the field of views 904, 906 of the respective devices 902 covers substantially the entire intersection from two different angles. Additionally, in certain embodiments, the detection devices 902 may be arranged linearly along a roadway 908 such that the fields of view 910, 912 of the detection devices 902 extend down the roadway 908 with less emphasis placed on side or cross streets. In this manner, a large area of an urban environment may be monitored with fewer detection devices 902 than by arranging one at each corner or intersection. As will be described below, in certain embodiments the detection devices 902 may be close enough to one another to communicate and provide information, such as image data, to different detection devices 902. Accordingly, a moving object of interest that has passed multiple detection devices 902 may be followed throughout its motion, even after moving out of the field of view of one of the detection devices 902.

Figure 10:
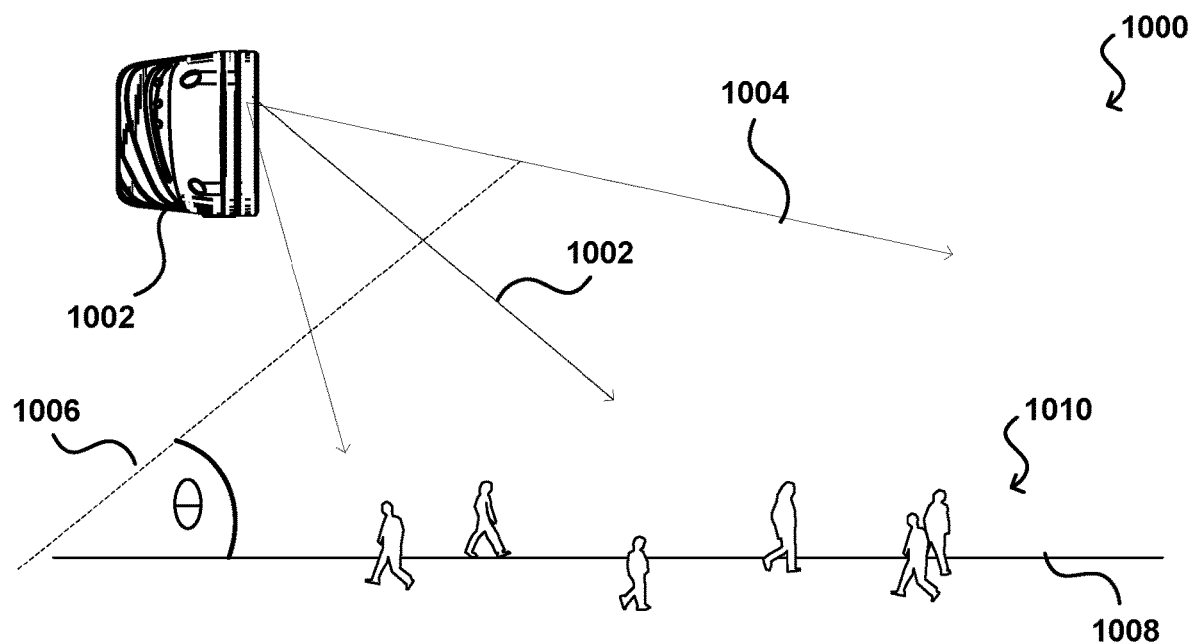
FIG. 10 illustrates an example implementation including an object detection device and potential objects of interest that can be utilized in accordance with various embodiments.

FIG. 10 illustrates an example arrangement 1000 in which a detection device can capture and analyze video information in accordance with various embodiments. In this example, the detection device 1002 is positioned with the front face substantially vertical, and the detection device at an elevated location, such that the field of view 1004 of the cameras of the device is directed towards a region of interest 1008, where that region is substantially horizontal (although angled or non-planar regions can be analyzed as well in various embodiments). As mentioned, the cameras can be angled such that a primary axis 1012 of each camera is pointed towards a central portion of the region of interest. In this example, the cameras can capture video data of the people 1010 walking in the area of interest. As mentioned, the disparity information obtained from analyzing the corresponding video frames from each camera can help to determine the distance to each person, as well as information such as the approximate height of each person. If the detection device is properly calibrated the distance and dimension data should be relatively accurate based on the disparity data. The video data can be analyzed using any appropriate object recognition process, computer vision algorithm, artificial neural network (ANN), or other such mechanism for analyzing image data (i.e., for a frame of video data) to detect objects in the image data. The detection can include, for example, determining feature points or vectors in the image data that can then be compared against patterns or criteria for specific types of objects, in order to identify or recognize objects of specific types. Such an approach can enable objects such as benches or tables to be distinguished from people or animals, such that only information for the types of object of interest can be processed.

In this example, the cameras capture video data which can then be processed by at least one processor on the detection device. The object recognition process can detect objects in the video data and then determine which of the objects correspond to objects of interest, in this example corresponding to people. The process can then determine a location of each person, such as by determining a boundary, centroid location, or other such location identifier. The process can then provide this data as output, where the output can include information such as an object identifier, which can be assigned to each unique object in the video data, a timestamp for the video frame(s), and coordinate data indicating a location of the object at that timestamp. In one embodiment, a location (x, y, z) timestamp (t) can be generated as well as a set of descriptors (d1, d2, . . . ) specific to the object or person being detected and/or tracked. Object matching across different frames within a field of view, or across multiple fields of view, can then be performed using a multidimensional vector (e.g., x, y, z, t, d1, d2, d3, . . . ). The coordinate data can be relative to a coordinate of the detection device or relative to a coordinate set or frame of reference previously determined for the detection device. Such an approach enables the number and location of people in the region of interest to be counted and tracked over time without transmitting, from the detection device, any personal information that could be used to identify the individual people represented in the video data. Such an approach maintains privacy and prevents violation of various privacy or data collection laws, while also significantly reducing the amount of data that needs to be transmitted from the detection device.

As illustrated, however, the video data and distance information will be with respect to the cameras, and a plane of reference 1006 of the cameras, which can be substantially parallel to the primary plane(s) of the camera sensors. For purposes of the coordinate data provided to a customer, however, the customer will often be more interested in coordinate data relative to a plane 908 of the region of interest, such as may correspond to the floor of a store or surface of a road or sidewalk that can be directly correlated to the physical location. Thus, in at least some embodiments a conversion or translation of coordinate data is performed such that the coordinates or position data reported to the customer corresponds to the plane 1008 (or non-planar surface) of the physical region of interest. This translation can be performed on the detection device itself, or the translation can be performed by a data aggregation server or other such system or service discussed herein that receives the data, and can use information known about the detection device 1002, such as position, orientation, and characteristics, to perform the translation when analyzing the data and/or aggregating/correlating the data with data from other nearby and associated detection devices. Mathematical approaches for translating coordinates between two known planes of reference are well known in the art and, as such, will not be discussed in detail herein.

Figure 11:
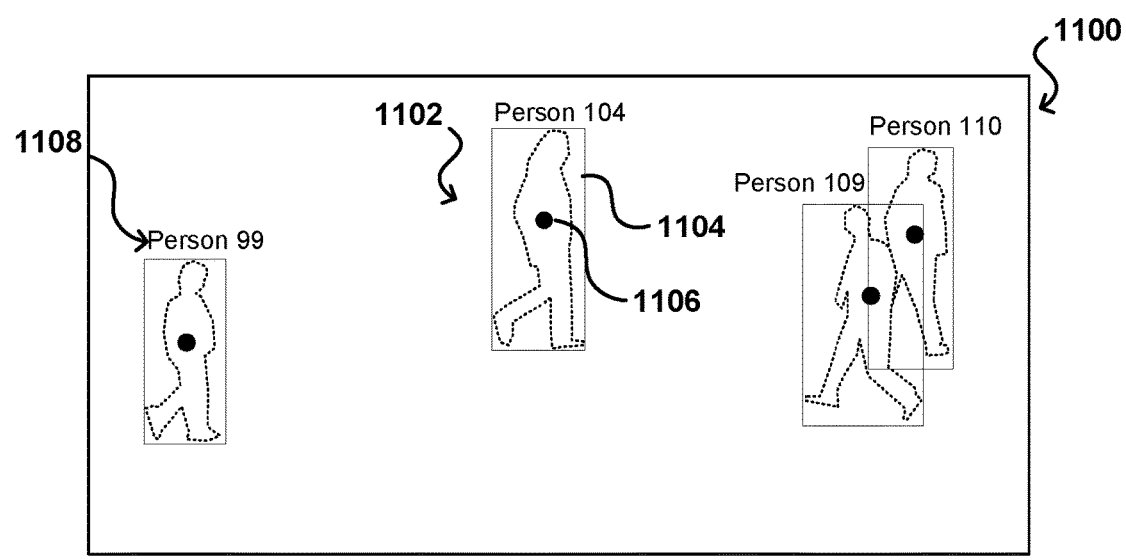
FIG. 11 illustrates an example implementation including an object detection device and potential objects of interest that can be utilized in accordance with various embodiments.

FIG. 11 illustrates an example type of data 1100 that can be obtained from a detection device in accordance with various embodiments. In this example, the dotted lines represent people 1102 who are contained within the field of view of the cameras of a detection device, and thus represented in the captured video data. After recognition and analysis, the people can be represented in the output data by bounding box 1104 coordinates or centroid coordinates 1106, among other such options. As mentioned, each person (or other type of object of interest) can also be assigned a unique identifier 1108 that can be used to distinguish that object, as well as to track the position or movement of that specific object over time. Where information about objects is stored on the detection device for at least a minimum period of time, such an identifier can also be used to identify a person that has walked out of, and back into, the field of view of the camera. Thus, instead of the person being counted twice, this can result in the same identifier being applied and the count not being updated for the second encounter. There may be a maximum amount of time that the identifying data is stored on the device, or used for recognition, such that if the user comes back for a second visit at a later time this can be counted as a separate visit for purposes of person count in at least some embodiments. In some embodiments the recognition information cached on the detection device for a period of time can include a feature vector made up of feature points for the person, such that the person can be identified if appearing again in data captured by that camera while the feature vector is still stored. It should be understood that while primary uses of various detection devices do not transmit feature vectors or other identifying information, such information could be transmitted if desired and permitted in at least certain embodiments.

Figure 12A:
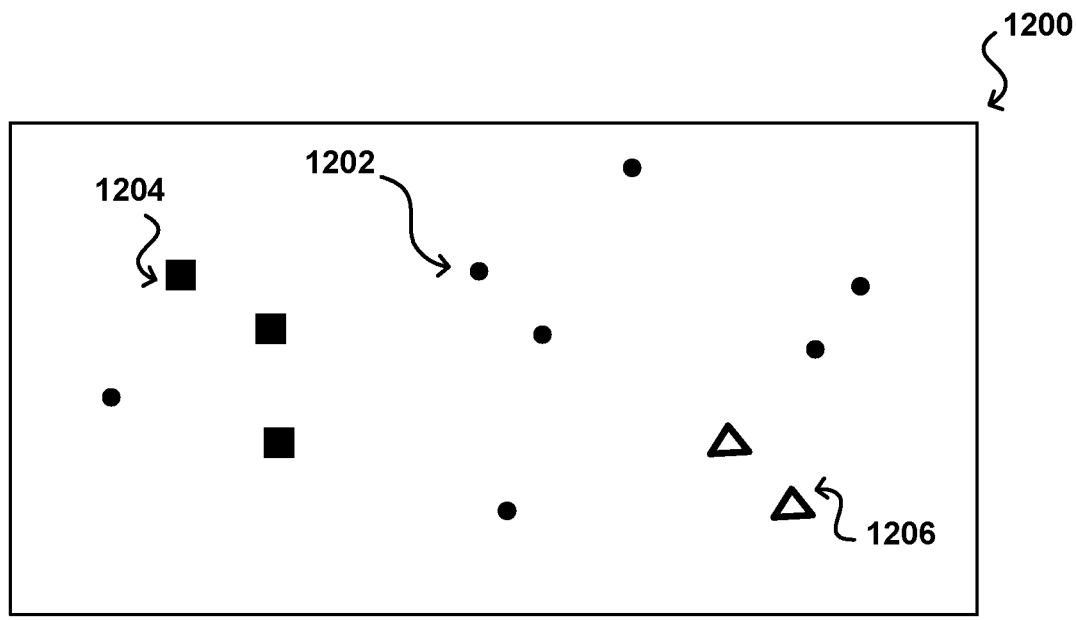
FIG. 12A illustrates an example implementation of captured and analyzed video data that can be utilized in accordance with various embodiments.
Figure 12B:
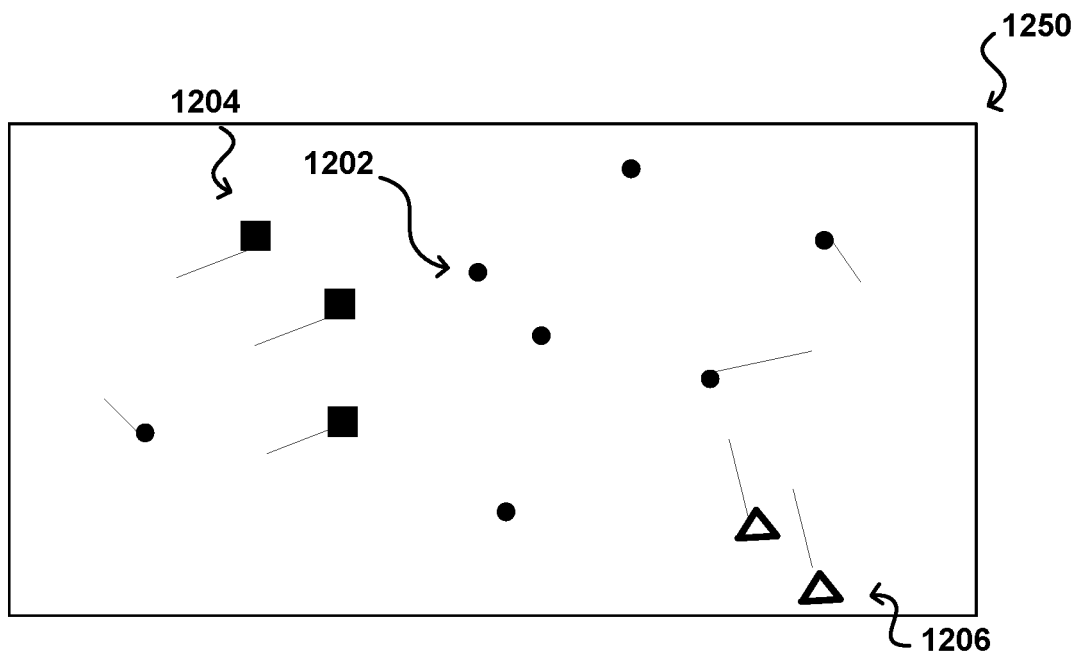
FIG. 12B illustrates an example implementation of captured and analyzed video data that can be utilized in accordance with various embodiments.

The locations of the specific objects can be tracked over time, such as by monitoring changes in the coordinate information determined for a sequence of video frames over time. As an example, FIGS. 12A and 12B illustrate object data for two different frames in a sequence of frames (not necessarily adjacent frames in the sequence) of captured and analyzed video data. In the example object data 1200 illustrated in FIG. 12A, there are three types 1202, 1204, 1206 of objects of interest that have been recognized. The type of object and position for each object can be reported by the detection device and/or data service, such that a customer can determine where objects of different types are located in the region of interest. FIG. 12B illustrates object data 1250 for a subsequent point in time, as represented by another frame of stereoscopic video data (or other captured image data). This example set shows the updated location of the objects at a subsequent point in time. The changes or differences in position data (represented by the line segments in the image) show the movement of those objects over that period of time. This information can be utilized to determine a number of different types of information. In addition to the number of objects of each type, this can be used to show where those types of objects are generally located and how they move throughout the area. If, for example, the types of objects represent people, automobiles, and bicycles, then such information can be used to determine how those objects move around an intersection, and can also be used to detect when a bicycle or person in in the street disrupting traffic, a car is driving on a sidewalk, or another occurrence is detected such that an action can be taken. As mentioned, an advantage of approaches discussed herein is that the position (and other) information can be provided in near real time, such that the determination of the occurrence can be determined while the occurrence is ongoing, such that an action can be taken. This can include, for example, generating audio instructions, activating a traffic signal, dispatching a security officer, or another such action. The real time analysis can be particularly useful for security purposes, where action can be taken as soon as a particular occurrence is detected, such as a person detected in an unauthorized area, etc. Such real time aspects can be beneficial for other purposes as well, such as being able to move employees to customer service counters or cash registers as needed based on current customer locations, line lengths, and the like. For traffic monitoring, this can help determine when to activate or deactivate metering lights, change traffic signals, and perform other such actions.

In certain embodiments, a user or target object may benefit from being informed about an event or occurrence in their vicinity. For example, an autonomous vehicle may benefit from receiving a notification regarding upcoming traffic such that the vehicle can decide how to proceed. Additionally, a user may benefit from receiving a notification about an emergency event nearby in order to avoid potential danger. Embodiments of the present disclosure may be directed toward providing alerts or data to users or target objects regarding events that exceed a threshold, such as a threshold level of importance or threshold distance from the user and/or target object. In certain embodiments, the information may be transmitted directly from the object detection device via a near field communication protocol. Additionally, in certain embodiments, the information may be transmitted over a cellular network or other communications protocol. Because the alert will be a small, discrete event of immediate importance to the user, the bandwidth of data may be reduced, thereby enabling fast transmission as well as not overloading the user's network bandwidth. In this manner, alerts may be transmitted from the object detection device to nearby users and/or target objects indicative of events that are greater than a threshold importance.

Figure 13:
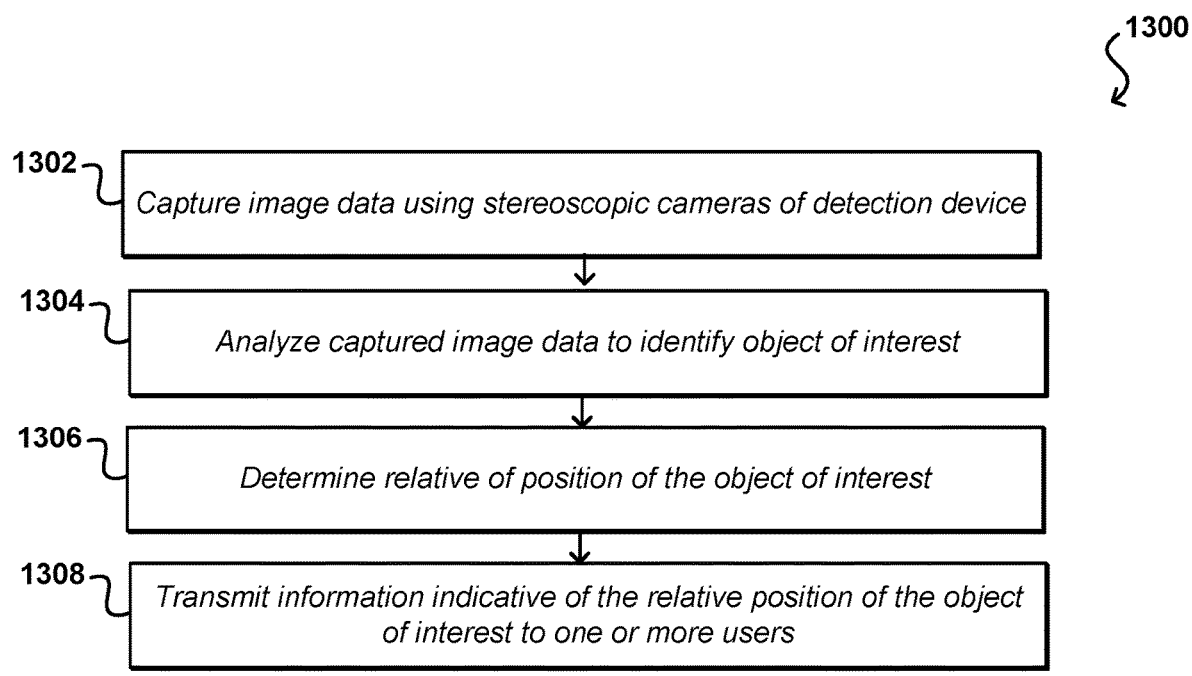
FIG. 13 illustrates an example process for transmitting a message to a user based on an object of interest that can be utilized in accordance with various embodiments.

FIG. 13 is a flow chart of an embodiment of a method 1300 for transmitting an alert to a user, which may include a client device of the user and/or a target object that receives information on behalf of a user, such as an autonomous vehicle. The object detection device acquires image data corresponding to at least one object of interest 1302. In embodiments, the object of interest is a vehicle. The vehicle may be in motion, such as a vehicle moving along a roadway, or may be at rest, such as a vehicle waiting at a traffic light or parked at a curb. Upon receipt of the data, the object of interest is detected 1304. For instance, the object of interest may be extracted from its surroundings to thereby enable tracking of movement of the object of interest. In embodiments where the object of interest is a vehicle, the vehicle may be extracted from other surrounding objects, such as pedestrians, buildings, or street signs. Next, the relative position of the object of interest may be determined 1306. The relative position may include one or more components, such as speed, direction of travel, elevation, and the like. Moreover, the relative position of the object of interest may be determined with respect to a user or target object. For example, the user may have a client device that includes a mobile application that is enabled to receive data from one or more object detection devices. Accordingly, relative positions may be determined with respect to the position of the user/the client device. In various embodiments, the object of interest is a vehicle. As such, the relative position of the vehicle relative to the user may include components such as distance, direction of travel, speed, estimated time to interaction, or the like. This calculation may be utilized to provide alerts to the user of impending interactions with the vehicle. Moreover, the calculation may provide the user with information in order to make a determination. For example, the relative position may indicate to the user that an emergency situation, such as a car accident, is close to the user. With the information, the user may choose avoid the accident, for example, by choosing a different route. Information is transmitted to the user 1308 so that the user can make a determination on how to react to the information. In various embodiments, the information is an alert or notification transmitted to the user, for example via the client device. The alert may be transmitted through a network interface, such as the Internet or a cellular network, or may be directly transmitted from an object detection device, for example via near field communication techniques such as Bluetooth®. In this manner, information regarding an object of interest may be acquired, analyzed, and transmitted to the user or target object.

Figure 14:
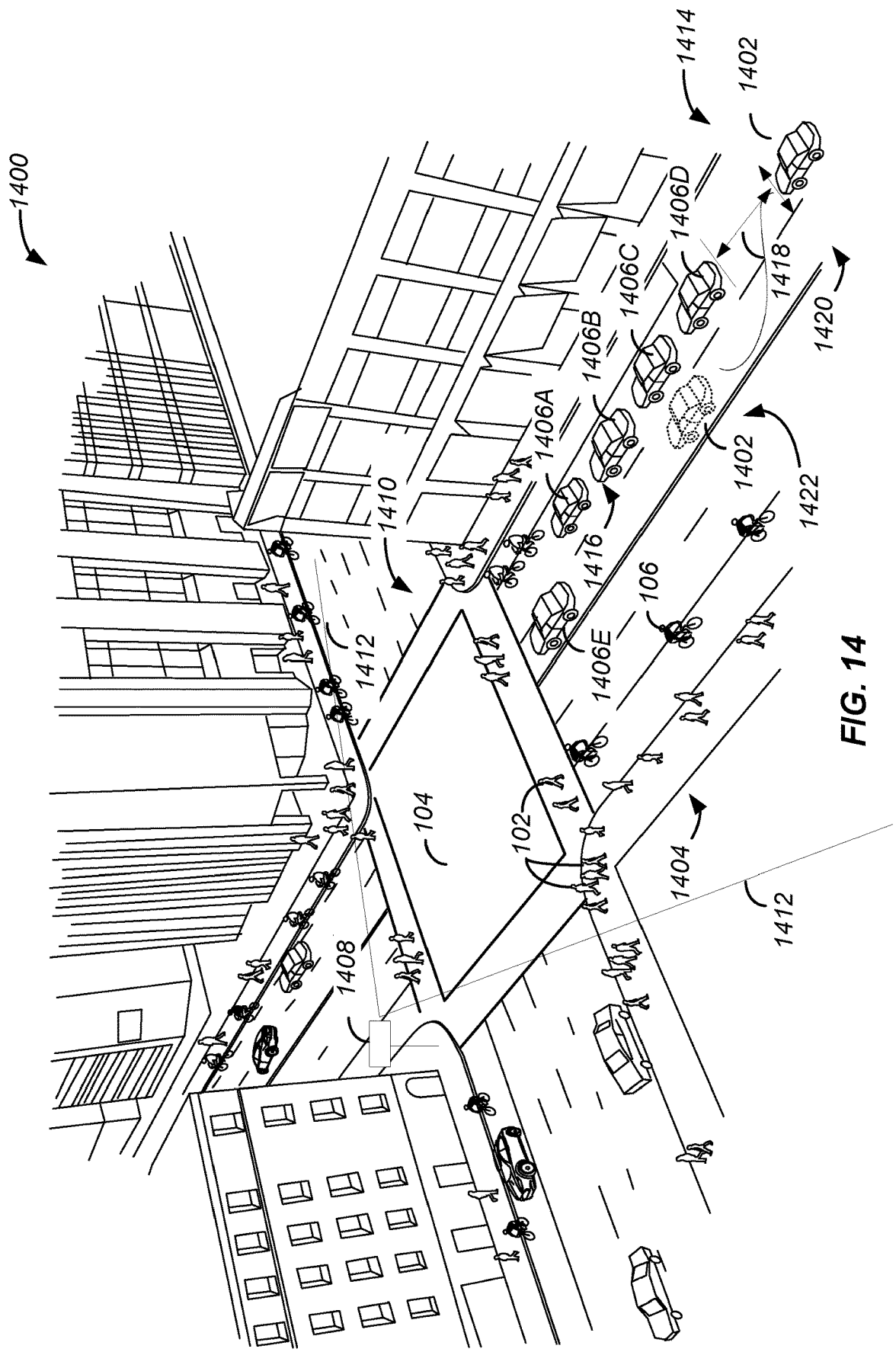
FIG. 14 illustrates an example implementation of an object detection device evaluating traffic flow that can be utilized in accordance with various embodiments.

FIG. 14 illustrates an example implementation 1400 of a target object 1402 travelling along a roadway 1404. In the illustrated embodiment, the target object 1402 is a vehicle and the roadway includes a number of additional vehicles 1406A-1406E. In various embodiments, an object detection device 1408 is arranged at an intersection 1410 between roadways. The field of view 1412 of the object detection device 1408 includes the roadway 1404 before crossing the intersection 1410. As shown in FIG. 14, as the target object 1402 approaches the intersection 1410, it is in a first position 1414, corresponding to a first lane 1416 on the roadway 1404. However, as shown, the first lane 1416 may not be the optimal or most efficient lane for the target object 1402 because there are four vehicles 1406A-1406D in the same lane at a stop at the intersection 1410. As such, the user's experience driving along the roadway 1404 is lessened due to traffic. This may cause the user to be late to an appointment or become frustrated with travelling.

In various embodiments, the object detection device 1408 analyzes the intersection 1410 and transmitted one or more pieces of information to the target object 1402. The transmission may be directly to the target object 1402, in embodiments where the target object is an autonomous vehicle capable of receiving transmissions. Additionally, the information may be transmitted to a user in the target object 1402, for example via a client device. In various embodiments, the transmission may occur over a network, such as the Internet or a cellular network. However, this type of transmission utilizes bandwidth, which may be at a premium in terms of availability and/or cost. In other embodiments, one or more near field communication techniques may be utilized to transmit the information to the target object 1402. For example, when the target object 1402 is within a threshold distance of the object detection device 1408, the object detection device 1408 may recognize the target object 1402 and transmit one or more pieces of information. It should be appreciated that the object detection device 1408 may include software that determines whether or not the information will be transmitted to the target object 1402. For example, a threshold level of importance or interest may be evaluated before transmitting the information. If the information does not exceed the threshold, it is not transmitted.

In the embodiment illustrated in FIG. 14, the object detection device 1408 determines that the vehicles 1406A-1406E are objects of interest. It may also calculate the relative position of the vehicles 1406A-1406E with respect to the target object 1402. In the illustrated embodiment, a distance 1418 between the target object 1402 and the object of interest 1406D may be determined. As will be appreciated, the distance 1418 is selected because at the target object's current speed and direction, the first potential impact event is with the object of interest 1406D. The object detection device 1408 also surveys the field of view 1412 and recognizes that there are fewer objects of interest in a second lane 1420 than in the first lane 1416. Accordingly, the object detection device 1408 may transmit information indicative of the shortened wait or lessened traffic in the second lane 1420. Accordingly, the target object 1402 may change lanes and move into a second position 1422 in the second lane 1420, as illustrated by the target object 1402 in broken lines. For example, in embodiments where the target object 1402 is an autonomous vehicle, the information may be relayed and presented as a shortened route or reduced traffic route. In embodiments where the target object 1402 is a vehicle controlled by a human, the information may be relayed as less traffic or less wait. From there, the target object 1402 may determine how to respond to the information. For example, if the target object 1402 were making a right turn at the intersection 1410 the information may be ignored because moving to the second lane 1420 would take the target object 1402 out of position to make the right turn. However, if the target object 1402 were continuing to travel down the roadway 1404 then moving to the second lane 1420 may reduce wait times by being less congested with other traffic.

Figure 15:
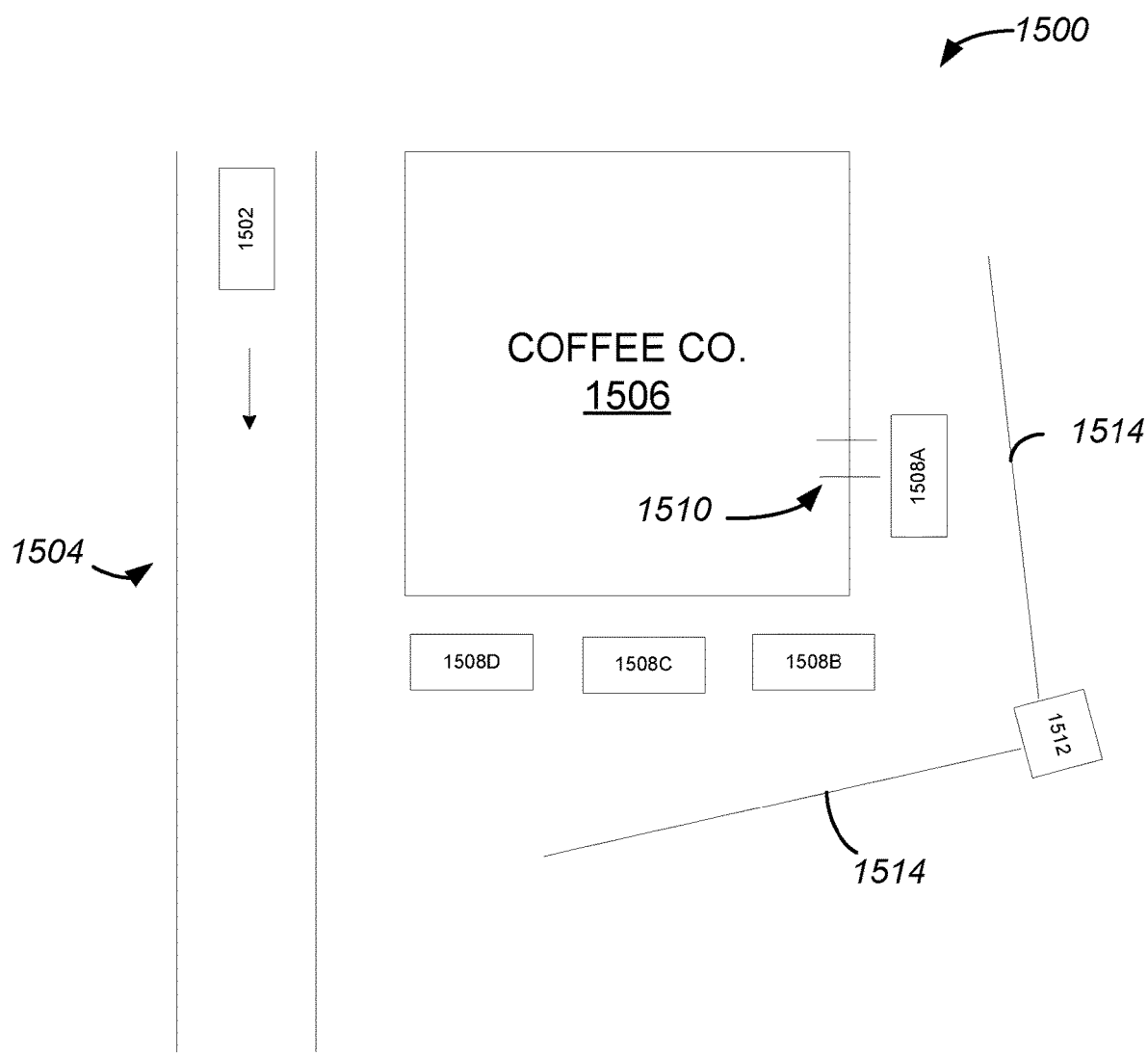
FIG. 15 illustrates an example implementation of an object detection device evaluating a queue at a business provider that can be utilized in accordance with various embodiments.

It should be appreciated that embodiments of the present disclosure may be utilized in other environments other than monitoring traffic flow and congestion. For example, a business may offer curbside pickup or drive thru service. Embodiments of the present disclosure may be used to alert the target object regarding potential wait times at these businesses. FIG. 15 is an example implementation 1500 of a target object 1502 travelling along a roadway 1504 toward a business provider 1506. As shown, the business provider 1506 offers a drive-thru pickup service and a queue of vehicles 1506A-D are waiting to receive their orders from a pickup window 1510. In the illustrated embodiment, an object detection device 1512 is arranged proximate the business provider 1506 such that a field of view 1514 includes the pickup window 1510 and area around the drive-thru. Accordingly, the object detection device 1512 may recognize the vehicles 1506A-D as objects of interest because they are blocking the target object's access to the pickup window 1510.

As the target object 1502 is approaching the business provider 1506, the object detection device 1512 may transmit a signal to the target object 1502 indicative of a wait time or number of vehicles 1506A-D that are in the queue. For example, in embodiments where the target object 1502 is an autonomous vehicle, the object detective device 1512 may transmit the information indicative of the queue. If the target object 1502 is intended to stop at the business provider 1506 then the target object 1502 may utilize the information to determine whether it would be faster to go to a different business provider 1506 or for the passenger of the target object 1502 to head into the business provider 1506 rather than waiting in the queue. Alternatively, the object detection device 1512 may transmit a message to the user or client device indicative of a wait time or number in line at the business provider 1506. From there, the user can determine whether waiting in the line is acceptable. In certain embodiments, the number in the queue or calculated wait time may be compared against a threshold to determine whether to transmit the data. For example, a queue of only a single vehicle 1506A may not raise to a threshold level of importance. However, a queue of a dozen vehicles may raise to the level to be sufficiently long of a wait such that the user will likely determine to go to a different business provider 1506. In this manner, the object detection device 1512 may be used to estimate wait times at business providers 1506 to enable users to efficiently plan their activities around the wait time.

Figure 16:
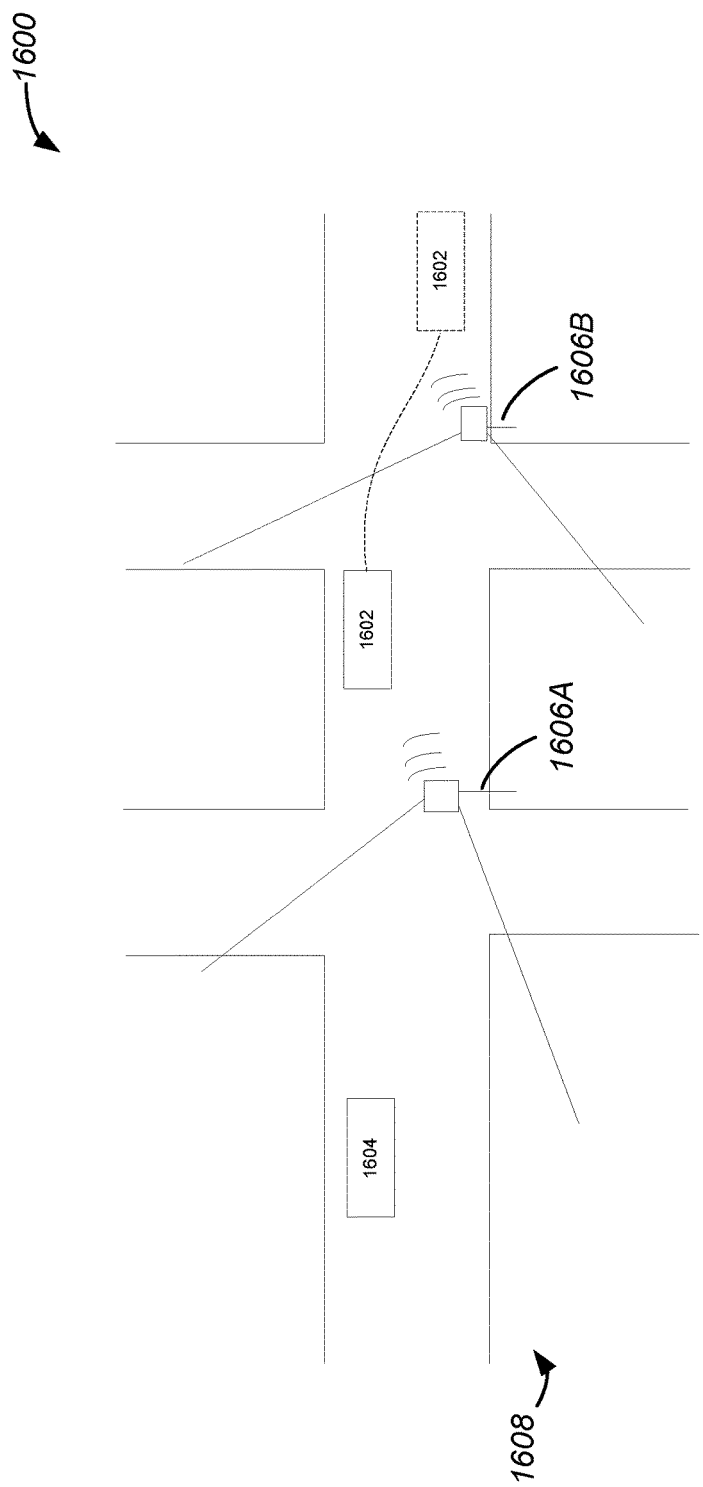
FIG. 16 illustrates an example implementation of an object detection device evaluating traffic flow that can be utilized in accordance with various embodiments.

In various embodiments, the present disclosure may be used to provide an alert to target objects regarding emergency vehicles on roadways. In many jurisdictions, vehicles will "pull over" or change lanes to enable swift passage of emergency vehicles down roadways. However, users may not realize an emergency vehicle is upon them with enough time to move out of the way. As such, the emergency vehicle slows down to wait for the obstructing vehicle, thereby decreasing the response time of the emergency vehicle. FIG. 16 is an example implementation 1600 in which a target object 1602 is alerted to the upcoming presence of an emergency vehicle 1604 by an object detection device 1606. The illustrated embodiment includes a roadway 1608 on which both the target object 1602 and the emergency vehicle 1604 are travelling. As shown, the target object 1602 is in the same lane as the emergency vehicle 1604 and as a result would block the emergency vehicle 1604 from proceeding unimpeded along the roadway 1608. In the illustrated embodiment, the first object detection device 1606A acquires data and extracts the emergency vehicle 1604 as the object of interest. It thereafter transmits the information to the second object detection device 1606B, which has the target object 1602 in its field of view. Accordingly, the relative position of the emergency vehicle 1604 may be calculated and an alert may be transmitted to the target object 1602. This alert may include information indicative of the time of interaction with the emergency vehicle 1604 or instructions to move for the oncoming emergency vehicle. This information may be utilized by the target object 1602 to act, such as moving to a different lane to enable the emergency vehicle 1604 to travel unimpeded along the roadway 1608, as illustrated by the broken lines in FIG. 16.

In various embodiments, the object detection device may be utilized to transmit instructions or messages to one or more target objects, such as autonomous vehicles or people. For example, a person or user may have an application installed on a client device, such as a mobile phone, tablet, wearable computer, or the like, that receives alerts from one or more object detection devices. In certain embodiments, the data transmission may be over one or more wireless networks, such as a cellular network on a wireless internet network. Additionally, in embodiments near field communication techniques may be used to transmit the messages, such as via Bluetooth®. Regardless of the transmission method, it is desirable to reduce bandwidth of the transmission. Large transmissions may have latency and the alert or message may no longer be application to the target object by the time the transmission completes. Additionally, bandwidth restrictions, due to availability or cost, further drive desirability to reduce the bandwidth of the transmissions. In certain embodiments, the target object may receive one or more alerts or messages have a threshold importance when the target object is within a predetermined distance of the object detection device. In this manner, alerts related to events that are in the immediate vicinity or very close to the target object may be quickly and efficiency transmitted.

Figure 17:
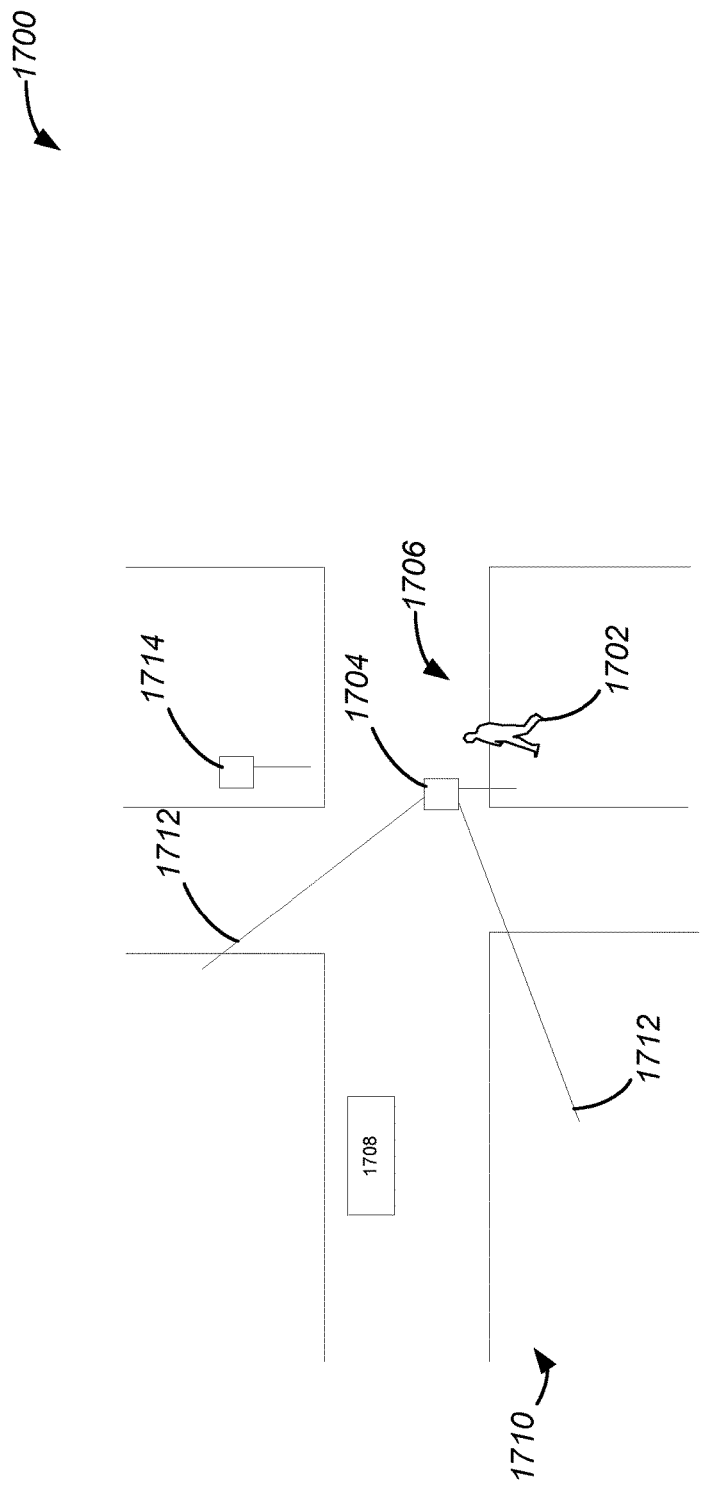
FIG. 17 illustrates an example implementation of an object detection device evaluating traffic flow that can be utilized in accordance with various embodiments.

FIG. 17 is an example implementation 1700 of a target object 1702, in this example embodiment a person, arranged proximate an object detection device 1704. In the illustrated embodiment, the target object 1702 is arranged at a street corner 1706 and a vehicle 1708, which may be an object of interest, is travelling down a roadway 1710 at a high speed. As illustrated, the vehicle 1708 is within a field of view 1712 of the object detection device 1704. Accordingly, the object detection device 1704 may determine the vehicle 1708 is an object of interest and determine its relative position with regard to the target object 1702. In embodiments, the object detection device 1704 may receive additional information from other sources, such as the traffic light 1714 and determine that the vehicle 1708 is travelling toward a red light at a rate that may exceed the vehicle's ability to stop in time. Based on the evaluation of the relative position of the vehicle 1708, the object detection device 1704 may transmit an alert or message to the target object 1702 indicating that a rapidly moving vehicle is approaching and to be cautious. For example, the alert may be a prompt (e.g., auditory, visual, haptic, etc.) to rapidly transmit the message to the target object 1702. The message may have a reduced bandwidth, such as just an alert indicating some event that the user should be alerted to is in the area. Or, in embodiments, the alert may be a visual message, such as "Car Approaching" or "Accident Ahead" to provide information to the target object 1702. As such, the target object 1702 may be alerted to surrounding dangers and can choose to take action to protect itself.

It should be appreciated that such alerts may be utilized in various embodiments other than the example implementation illustrated in FIG. 17. For example, the object detection device may be arranged proximate a "pedestrian only" area. Upon detection of a vehicle heading toward the pedestrian only area, alerts may go out to the pedestrians to seek coverage or protection. Additionally, alerts regarding potentially unsafe events, such as dangerous situations or accidents may also be transmitted to users proximate various object detection devices. In certain embodiments, the object detection devices may be linked to one another, for example via a network or through near field communication techniques, to transmit information along a chain or series of devices. Therefore, target objects further away from the potentially dangerous or unusual event will also receive the alert, for example from a closer object detection device, to thereby provide additional time to seek cover or protection.

Figure 18:
FIG. 18 illustrates an example implementation of a user interface that can be utilized in accordance with various embodiments.

FIG. 18 is an example implementation 1800 of an embodiment of a client device 1802. The client device 1802 includes an application 1804, for example installed in memory stored on the client device with instructions executed by a processor, for interaction between the client device 1802 and one or more object detection devices. In the illustrated embodiment, the application includes a window 1806 for receiving messages or alerts. As shown, the window 1804 includes the textual message "ALERT!" and may also include an auditory alarm 1808 and/or other indicators. For example, the client device 1802 may vibrate, emit a sound, flash a certain color, and transmit a textual message when receiving information. In the illustrated embodiment, the application 1804 also includes a search input 1810. The search input 1810 may receive an input or question from the user, for example asking about traffic at a certain location or about a wait time at a business provider. The search input 1810 may be transmitted to a server in communication with multiple object detection devices. This input may be processed and a response returned to the client device 1802. In various embodiments, the processing and bandwidth usage associated with a user-implemented search is larger than the bandwidth used to transmit an alert or message because to answer the question from the user additional information may be retrieved, such as information and analysis from multiple object detection devices arranged at a distance apart from one another and/or the user.

As described above, in various embodiments alerts or messages may be transmitted from one or more object detection devices. The alerts may be transmitted based at least in part on an importance or relevance threshold. That is, impending consequences from the alert or message exceed a threshold amount in order to be transmitted to the user. In this manner, low importance messages, such as a minor accident many miles away, will not be transmitted and therefore reduce bandwidth usage of the system. However, very highly important messages, such as a vehicle travelling at a rapid speed through a pedestrian-only area, may be transmitted in real or near-real time (e.g., without significant delay) to enable the user to react. In various embodiments, a hierarchy of importance for these events may be established in order to determine the threshold. This hierarchy may be driven by one or more machine learning methods in order to aggregate and analyze data and potential outcomes from the data.

Figure 19:
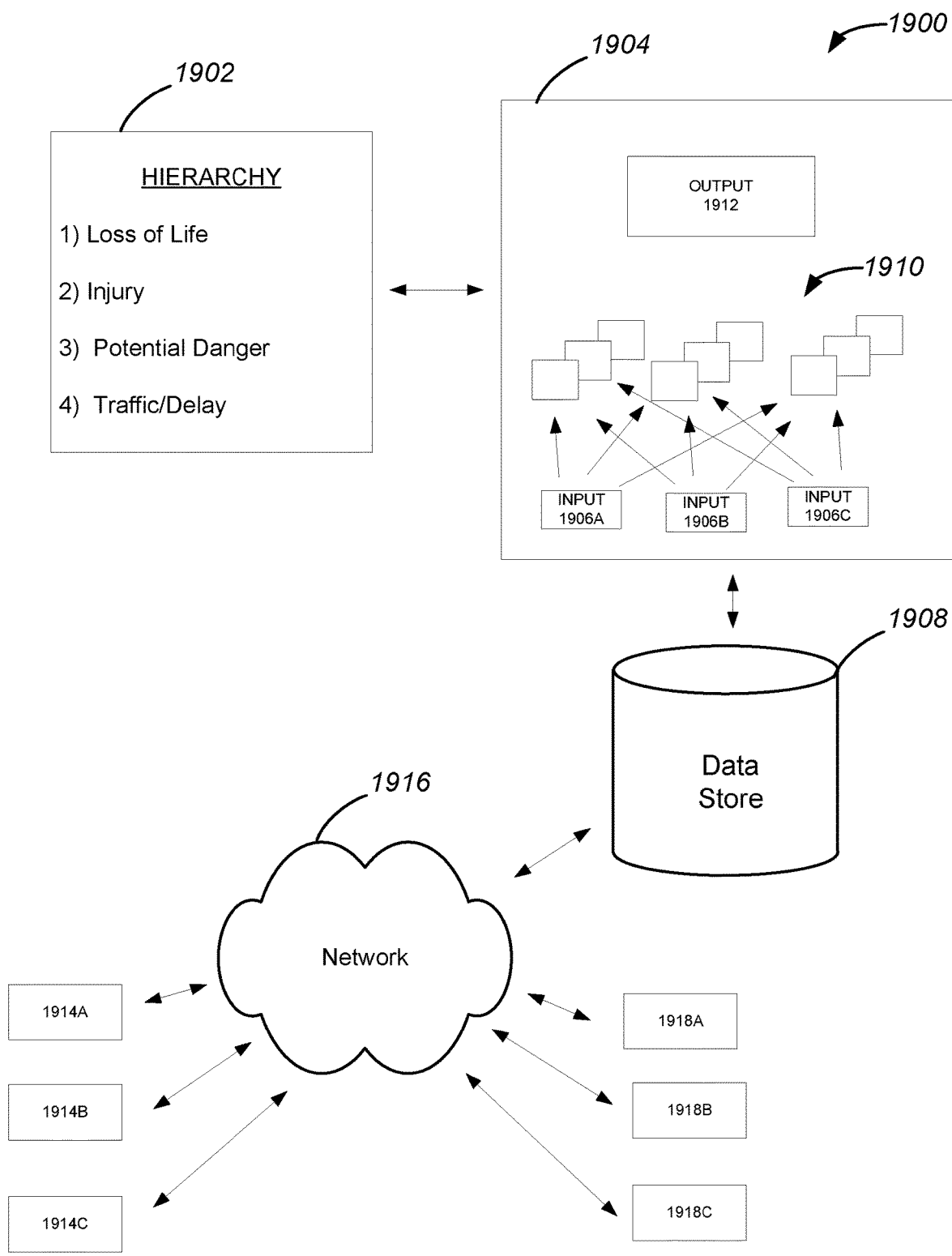
FIG. 19 illustrates an example system diagram that can be utilized in accordance with various embodiments.

FIG. 19 is an example implementation 1900 of establishing a hierarchy 1902 to transmit alerts or messages. In the illustrated embodiment, the hierarchy 1902 ranks one or more events or situations that a target object may encounter. In the illustrated embodiment, the highest ranking is for "Potential Loss of Life." For example, an impending interaction between a pedestrian and a vehicle may be designated in this category. Moreover, a potentially dangerous event, such as a vehicle travelling along a pedestrian area may also be in this category. Next, in the illustrated embodiment, a category for "Injury" is present, followed by "Potential Danger," and "Traffic/Delays." It should be appreciated that these are merely examples and in other embodiments different categories or hierarchies may be established.

In various embodiments, a machine learning system 1904, such as a system incorporating one or more neural networks, may be utilized to establish the hierarchical rankings. The illustrated machine learning system 1904 receives inputs 1906A-1906C from a data store 1908. These inputs may be aggregated and evaluated, for example in one or more convolutional and/or hidden layers 1910 of the machine learning system 1904. In embodiments, the neural network may apply one or more pooling or nonlinearity steps in order to evaluate the data. The input data 1906A-1906C may include data acquired from a plurality of object detection devices and also results or actions from one or more client devices. As a result, the machine learning system 1904 can analyze previous alerts and how users reacted to those alerts to determine the hierarchy. The analysis may lead to an output 1912 that is used to establish the hierarchy 1902.

As described above, the illustrated embodiment includes a plurality of object detection devices 1914A-1914C that transmit data to the data store 1908 via a network 1916. Additionally, a plurality of client devices 1918A-1918C also transmit data to the data store 1908 via the network 1916. It should be appreciated that the network 1916 may be an Internet network that enables two-way communication between the data store 1908 and the object detection devices 1914A-1914C and the client devices 1918A-1918C, such as an Ethernet network, cellular network, Wi-Fi network, or the like. Accordingly, data may be collected and aggregated from a variety of sources in order to further develop and refine the hierarchy 1902.

In various embodiments, an alert or message may be transmitted to a target object based on a relative position of an object of interest. Furthermore, the importance of the message, which may be determined at least in part by the relative position of the object of interest, may further provide a threshold for deciding whether or not an alert is transmitted. As a result, the bandwidth utilized to transmit messages may be reduced because only messages having a threshold importance will be transmitted or pushed to the user. Otherwise, the user may separately request the information via a search. In certain embodiments, the alerts or messages may be transmitted when a user is within a predetermined distance of an object detection device. This communication may be via near field communication techniques, such as Bluetooth®, and thereby may not utilize much bandwidth for transmission. Additionally, the alert or message may come directly from the object detection device, rather than from a network, thereby decreasing the latency and transmitting the message faster. By receiving the message sooner than via network transmission, the target object can choose how to react to the information with additional time. In various embodiments, the alert or message may include a textual alert, a visual alert (e.g., a change in color of the screen of a client device), an auditory alert, a haptic alert, or a combination thereof. For example, a highly important message may turn the client device screen red, flash a message about an alert, vibrate, and also make a sound to grab the user's attention. As a result, the user will quickly receive information about a potentially dangerous event and be able to react or seek shelter.

Figure 20:
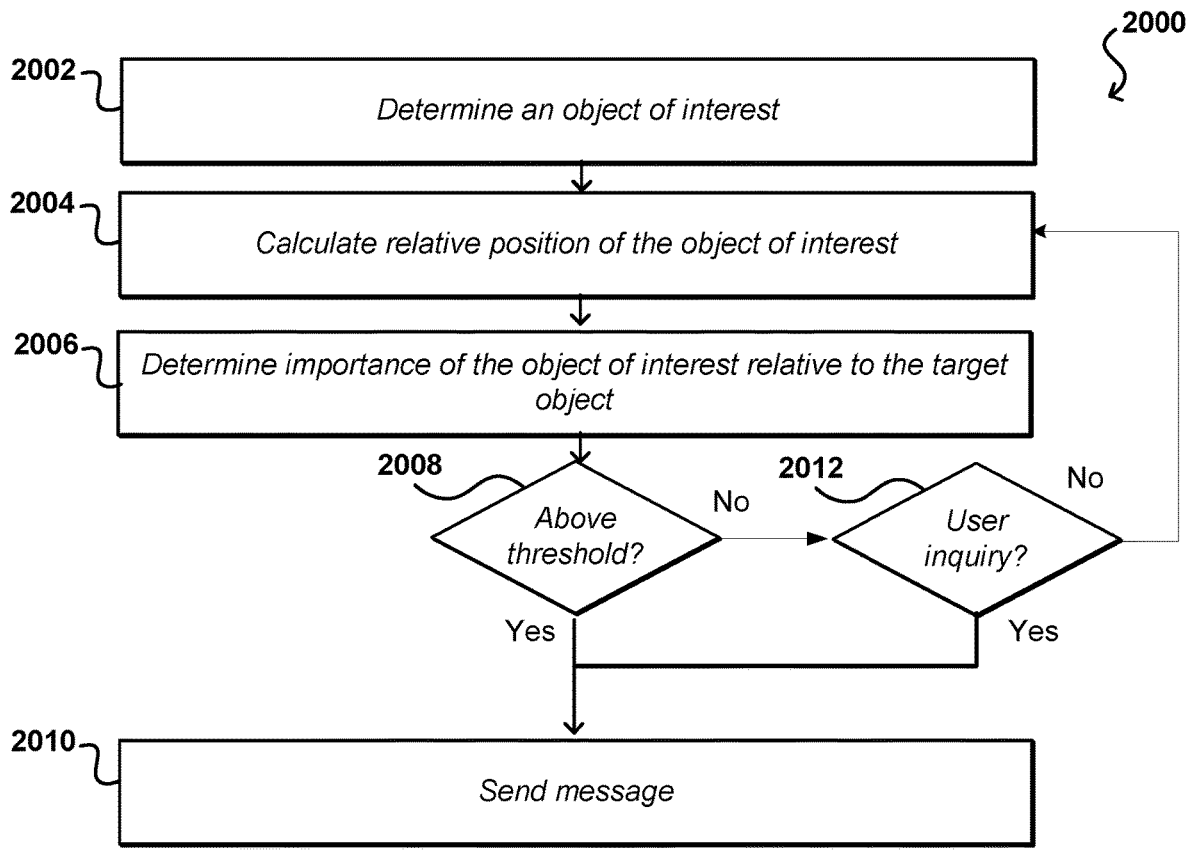
FIG. 20 illustrates an example process for transmitting a message to a user based on an object of interest that can be utilized in accordance with various embodiments.

FIG. 20 is an example process 2000 for transmitting a message to a user based on a relative position of an object of interest. The object of interest is determined 2002, for example by evaluating a captured image data from an object detection device. Upon receipt of the captured image data, the object of interest may be identified and extracted. Then, a relative position of the object of interest is calculated 2004. In embodiments, the relative position is evaluated with reference to a target object, such as an autonomous vehicle or a user. The relative position may incorporate one or more factors related to the object of interest, such as a speed, a direction of travel, a position relative to the object detection device, and the like. Next, an importance of an event is determined 2006. The event may be related to the target object, such as an impact event or an interaction between the object of interest and the target object. For example, the event may be an impending collision between vehicles, an emergency vehicle, or a dangerous event such as a vehicle driving along a sidewalk. A database, such as the hierarchy discussed with reference to FIG. 19 may be utilized to determine the importance of the event. For example, a potentially life-threatening event may be deemed highly important while a potential nuisance, such as light traffic, may be deemed less important. In embodiments, the importance may be assigned a numerical value. Additionally, a confidence factor may accompany the importance assigned to the event.

In various embodiments, the importance of the event is evaluated against a threshold 2008. This threshold may be predetermined, for example by an administrator of the service or by the user. The threshold level of importance may determine whether or not to transmit a message to a user regarding the object of interest. For example, if the importance of the event is above the threshold, a message is transmitted 2010. This message may be an alert or warning to the user. Additionally, the message may be an informative message to anticipate a future event. For example, if the event is a life threatening event the message may include visual, haptic, and auditory components to quickly alert the user. In certain embodiments, the message may include a textual description of the event. However, in other embodiments, the message may just be an alert without the textual description. In this manner, bandwidth for message transmission may be reduced.

If the importance of the event is not above the threshold then further monitoring may occur. For example, the event may be evaluated to determine if the event is related to an inquiry submitted the user 2012. The user may enter search inquiries, such as asking whether traffic is present in an area or to evaluate a line at a local business provider. If the event is related to a user inquiry, the message is transmitted 2010. However, if the event is not related to a user inquiry, then monitoring of the object of interest continues. Accordingly, objects of interest may be tracked by updating their relative position without alerting the user until a threshold importance of the event is present. As such, bandwidth for transmitting the alerts will be reduced and the user will not be burdened or bothered by alerts that are not related to events they deem unimportant.

Client devices used to perform aspects of various embodiments can include any appropriate devices operable to send and receive requests, messages, or information over an appropriate network and convey information back to a user of the device. Examples of such client devices include personal computers, smart phones, handheld messaging devices, wearable computers, laptop computers, and the like. The network can include any appropriate network, including an intranet, the Internet, a cellular network, a local area network (LAN), or any other such network or combination thereof. Components used for such a system can depend at least in part upon the type of network and/or environment selected. Protocols and components for communicating via such a network are well known and will not be discussed herein in detail. Various aspects can be implemented as part of at least one service or Web service, such as may be part of a service-oriented architecture. In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any appropriate programming language.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   an object detection device comprising a camera to capture image data located within a field of view;
   a microprocessor for controlling an operational state of the object detection device;
   memory including instructions that, when executed by the microprocessor, cause the object detection device to:
   receive image data captured within a field of view of the camera;
   extract at least one object of interest from the image data;
   determine a relative position of the at least one object of interest with reference to a vehicle;
   create a data packet comprising data corresponding to the at least one object, the relative position, and one or more properties of the at least one object, the data packet having a smaller size than the image data;
   delete the image data; and
   transmit the data packet to the vehicle, wherein the vehicle determines whether to undergo action or inaction based on the contents of the data packet.

2. The system of claim 1, further comprising:
   a communication component for transmitting the relative position to the vehicle, wherein the transmission is limited to the relative position of the at least one object of interest.

3. The system of claim 2, wherein the communication component is a wireless internet transceiver, a Bluetooth® transceiver, a cellular transceiver, or a combination thereof.

4. The system of claim 1, wherein a data size of the data packet is smaller than a data size of the image data.

5. The system of claim 1, wherein the data packet is transmitted to the vehicle when the vehicle is within a threshold distance of the object detection device.

6. The system of claim 1, wherein the at least one object of interest comprises a plurality of objects of interest on a roadway, and the instructions that, when executed by the microprocessor, cause the objection detection device to further:
   determining a lane position of each object of interest of the plurality of objects of interest, the lane position corresponding to a lane of the roadway; and
   transmitting each respective lane position to the vehicle, wherein the vehicle compares the respective lane positions with a travel route and adjusts a vehicle lane position based on the respective lane positions of each object of interest when adjusting the vehicle lane position improves the efficiency of following the travel route.

7. The system of claim 1, wherein the relative position of the object of interest is within a threshold distance of the vehicle before data is transmitted to the vehicle.

8. A method, comprising:
   receiving image data captured by a camera of an object detection device;
   identifying at least one object of interest in the image data onboard the object detection device;
   determining a relative position of the at least one object of interest with reference to the object detection device;
   creating a data packet comprising data corresponding to the at least one object, the relative position, and one or more properties of the at least one object, the data packet having a smaller size than the image data;
   deleting the image data; and
   transmitting the data packet to a target object when a data size associated with the data packet is less than a threshold amount and when the at least one object of interest is within a threshold distance of the target object.

9. The method of claim 8, wherein the data size associated with the data packet is less than a data size of the image data, and the relative position of the at least one object of interest is determined via a microprocessor and a memory of the object detection device.

10. The method of claim 8, further comprising:
    determining if the relative position of the at least one object of interest is within a threshold of importance corresponding to a likelihood of interaction between the at least one object of interest and the target object; and
    alerting the target object when the relative position of the at least one object of interest is greater than the threshold of importance.

11. The method of claim 8, wherein the target object is a vehicle and further comprising:
    evaluating a traffic flow in an area within a field of a view of the camera;
    determining one or more objects of interest within the traffic flow; and
    transmitting data to the vehicle indicative of the traffic flow and relative positions of the one or more objects of interest, wherein the vehicle can determine whether to adjust one or more properties of a travel route based at least in part on the data.

12. The method of claim 11, wherein the one or more properties of the travel route comprise a lane on a roadway, a speed, a direction of travel, a designated route to a destination, or a combination thereof.

13. The method of claim 8, further comprising:
    evaluating an area within a field of view of the camera;
    determining one or more objects of interest within the area, the one or more objects of interest being arranged in a queue to perform an activity; and
    transmitting data to the target object indicative of a total number of objects of interest in the queue.

14. The method of claim 8, further comprising:
    receiving an inquiry from the target object indicative of a request for a relative position of one or more objects of interest; and
    transmitting the requested data to the target object, a data size of the requested data being larger than the threshold amount.

15. The method of claim 8, wherein the object detection device communicates directly with the target object via a communication element, the communication element comprising a wireless internet transceiver, a Bluetooth® transceiver, a cellular transceiver, or a combination thereof.

16. A system, comprising:
   an object detection device comprising a camera to capture image data located within a field of view;
   a microprocessor for controlling an operational state of the object detection device;
   memory including instructions that, when executed by the microprocessor, cause the object detection device to:
   obtain image data captured by the camera, the image data representing an area located within a field of view of the camera;
   identify an object of interest represented in the image data;
   determine an object type and a physical location for the object of interest;
   create a data packet comprising data corresponding to the object type, the physical location, and one or more properties of the object of interest, the data packet having a smaller size than the image data;
   delete the image data; and
   transmit the data packet to a target device, the target device determining whether to take an action based on the data packet.

17. The system of claim 16, wherein the data packet corresponds to traffic data in the area located within the field of view of the camera and the target device is a vehicle that adjusts one or more parameters of a route based at least in part on the data packet.

18. The system of claim 16, wherein the target device comprises a cloud computing network, an autonomous vehicle, a personal computing device, or a combination thereof.

19. The system of claim 16, wherein the instructions that, when executed by the microprocessor, cause the object detection device to:
   determine a relative position of the object of interest;
   determine if the relative position is within a threshold of importance corresponding to a likelihood of interaction between the object of interest and the target device; and
   alert the target device when the relative position of the object of interest is greater than the threshold of importance.

20. The system of claim 16, wherein the instructions that, when executed by the microprocessor, cause the objection detection device to further:
   receive an inquiry from the target device indicative of a request for a data packet; and
   transmit the requested data packet to the target device, a data size of the requested data packet being larger than the threshold amount.

* * * * *